United States Patent
Zhu et al.

(10) Patent No.: US 12,351,689 B2
(45) Date of Patent: Jul. 8, 2025

(54) NETWORKED SILICONES AND RELATED COMPOSITIONS, METHODS, AND COMPOUNDS

(71) Applicants: DOW SILICONES CORPORATION, Midland, MI (US); MASSACHUSETTS INSTITUTE OF TECHNOLOGY, Cambridge, MA (US)

(72) Inventors: Bizhong Zhu, Midland, MI (US); Kaila Mattson, Midland, MI (US); Jeremiah A. Johnson, Boston, MA (US); Deborah June Choi Ehrlich, Cambridge, MA (US)

(73) Assignees: DOW SILICONES CORPORATION, Midland, MI (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 790 days.

(21) Appl. No.: 17/629,302

(22) PCT Filed: Jul. 22, 2020

(86) PCT No.: PCT/US2020/043115
§ 371 (c)(1),
(2) Date: Jan. 21, 2022

(87) PCT Pub. No.: WO2021/016377
PCT Pub. Date: Jan. 28, 2021

(65) Prior Publication Data
US 2022/0251304 A1   Aug. 11, 2022

Related U.S. Application Data

(60) Provisional application No. 62/877,055, filed on Jul. 22, 2019.

(51) Int. Cl.
| | | |
|---|---|---|
| *C08G 77/20* | (2006.01) | |
| *C08G 77/00* | (2006.01) | |
| *C08G 77/44* | (2006.01) | |

(52) U.S. Cl.
CPC ............ *C08G 77/44* (2013.01); *C08G 77/20* (2013.01); *C08G 77/70* (2013.01)

(58) Field of Classification Search
CPC ......... C08G 77/20; C08G 77/44; C08G 77/70
See application file for complete search history.

(56) References Cited

U.S. PATENT DOCUMENTS

| | | |
|---|---|---|
| 5,703,163 A | 12/1997 | Baum |
| 5,811,193 A | 9/1998 | Baum |
| 6,251,993 B1 | 6/2001 | Baum et al. |
| 6,482,891 B2 | 11/2002 | Baum et al. |
| 6,730,408 B2 | 5/2004 | Baum et al. |

FOREIGN PATENT DOCUMENTS

| | | | | |
|---|---|---|---|---|
| CN | 106146804 A | * | 11/2016 | ............ C08G 59/68 |

OTHER PUBLICATIONS

Sun et al (CN 109666149), published on Apr. 23, 2019.*
International Search Report for PCT/US2020/043115 dated Oct. 29, 2020, 2 pages.
Sakurai, S., Watanabe, H. & Takahara, A., Preparation and characterization of looped polydimethylsiloxane brushes, Polym J 46, 117-122 (2014).
Robert F. T. Stepto, Jonathan I. Cail & David J. R. Taylor (2003) Formation, structure and properties of polymer networks: theory and modelling, Materials Research Innovations, 7:1, 4-9.
Kurt Baum, Jean C. Baum, and Tai Ho, Side-Loop Polymers Based on the Hydrosilylation of Polybutadiene, Journal of the American Chemical Society, 1998, 120 (13), 2993-2996.
Ehrlich, Deborah J. C., Synthetic strategies for control of structure from individual macromolecules to nanoscale materials to networks, Thesis for Massachusetts Institute of Technology. Department of Chemistry, submitted 2019.

* cited by examiner

*Primary Examiner* — Gregory Listvoyb
(74) *Attorney, Agent, or Firm* — Warner Nocross + Judd LLP

(57) ABSTRACT

A networked silicone is disclosed. The networked silicone comprises crosslinked strands of looped organosilicon compounds. A composition for preparing the networked silicone is also disclosed, and comprises (A) a looped organosilicon compound, (B) a crosslinking organosilicon compound, and optionally (C) a catalyst. Additionally, a method of preparing the networked silicone is disclosed, and comprises reacting the looped organosilicon compound (A) and the crosslinking organosilicon compound (B), optionally in the presence of the catalyst (C), to give the networked silicone. A reaction product comprising the networked silicone is also disclosed. The reaction product is prepared from the composition and/or in accordance with the method, and may be a cured product. Additionally, a composite article and a method of forming the same are disclosed. The composite article is formed by disposing a networked silicone composition on the substrate and curing the networked silicone composition, thereby preparing the composite article.

10 Claims, 19 Drawing Sheets

NETWORKED SILICONES AND RELATED COMPOSITIONS, METHODS, AND COMPOUNDS

CROSS-REFERENCE TO RELATED APPLICATIONS

This application is the U.S. National Stage of International Application No. PCT/US2020/043115 filed on 22 Jul. 2020, which claims priority to and all advantages of U.S. Provisional Application No. 62/877,055 filed on 22 Jul. 2019, the content of which is incorporated herein by reference.

FIELD OF THE INVENTION

The present disclosure generally relates to siloxane-containing networks and, more specifically, to compositions and methods for preparing a networked silicone and compositions and articles prepared therewith.

DESCRIPTION OF THE RELATED ART

Silicones are polymeric materials used in numerous commercial applications, primarily due to significant advantages they possess over their carbon-based analogues. More precisely called polymerized siloxanes or polysiloxanes, silicones have an inorganic silicon-oxygen backbone chain (—Si—O—Si—O—Si—O—) with organic side groups attached to the silicon atoms. Organic side groups may be used to link two or more of these backbones together. By varying the —Si—O— chain lengths, side groups, and crosslinking, silicones can be synthesized with a wide variety of properties and compositions. They can vary in consistency from liquid to gel to rubber to hard plastic.

Siloxane-based materials are known in the art and are utilized in myriad end use applications and environments. For example, organopolysiloxanes are utilized in numerous industrial, home care, and personal care formulations. However, the use of organopolysiloxanes in certain applications that may benefit from their particular attributes (e.g. low-loss and stable optical transmission, thermal and oxidative stability, etc.) remains limited due to the weak mechanical properties of conventional silicone networks manifesting in low tensile strength, tear strength, modulus, and mechanical energy storage/dissipation before fracture.

BRIEF SUMMARY OF THE INVENTION

A composition for preparing a networked silicone (the "composition") is disclosed. The composition comprises (A) a looped organosilicon compound, (B) a crosslinking organosilicon compound, and optionally (C) a catalyst. The looped organosilicon compound (A) has the general formula (I):

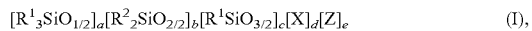

where each X is a looped moiety having the general formula (II):

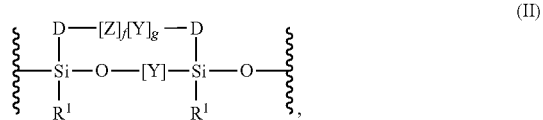

wherein each Y is an independently selected siloxane moiety having the formula $[R^2_iSiO_{(4-i)/2}]_h$; each Z is an independently selected organic moiety; each $R^1$ is an independently selected hydrocarbyl group; each $R^2$ is independently $R^1$ or a cross-linkable group, with the proviso that at least one $R^2$ is the cross-linkable group; each D is an independently selected divalent linking group; subscripts a, b, c, d, and e are each mole fractions such that a+b+c+d+e=1, with the provisos that $0 \le a < 1$, $0 < b \le 1$, $0 \le c < 1$, $0 < d \le 1$, and $0 \le e < 1$; subscripts f and g are each independently 0 or 1 with the proviso that f+g>0 in each looped moiety X; each subscript h is independently from 1 to 1000; subscript i is independently selected from 1, 2, and 3 in each moiety indicated by subscript h; and moieties indicated by subscripts a, b, c, d, and e may be in randomized or block form in the looped organosilicon compound (A). The crosslinking organosilicon compound (B) has the general formula $R^3$-L-$R^3$, where L is a linking group and each $R^3$ is an independently selected functional group reactive with the cross-linkable group $R^2$ of the looped organosilicon compound (A).

A method of preparing a networked silicone (the "preparation method") is also provided. The preparation method comprises reacting the looped organosilicon compound (A) and the crosslinking organosilicon compound (B), optionally in the presence of the catalyst (C), to give the networked silicone.

A networked silicone and a reaction product comprising the networked silicone, each prepared from the composition and/or in accordance with the method, are also provided. The reaction product may be a cured product.

A composite article and a method of forming a composite article (the "formation method") are also provided. The composite article comprises the reaction product or the cured product comprising the networked silicone disposed on the substrate. The formation method comprises disposing the composition for preparing a networked silicone on a substrate, and curing the composition to give the networked silicone on the substrate, thereby forming the composite article.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
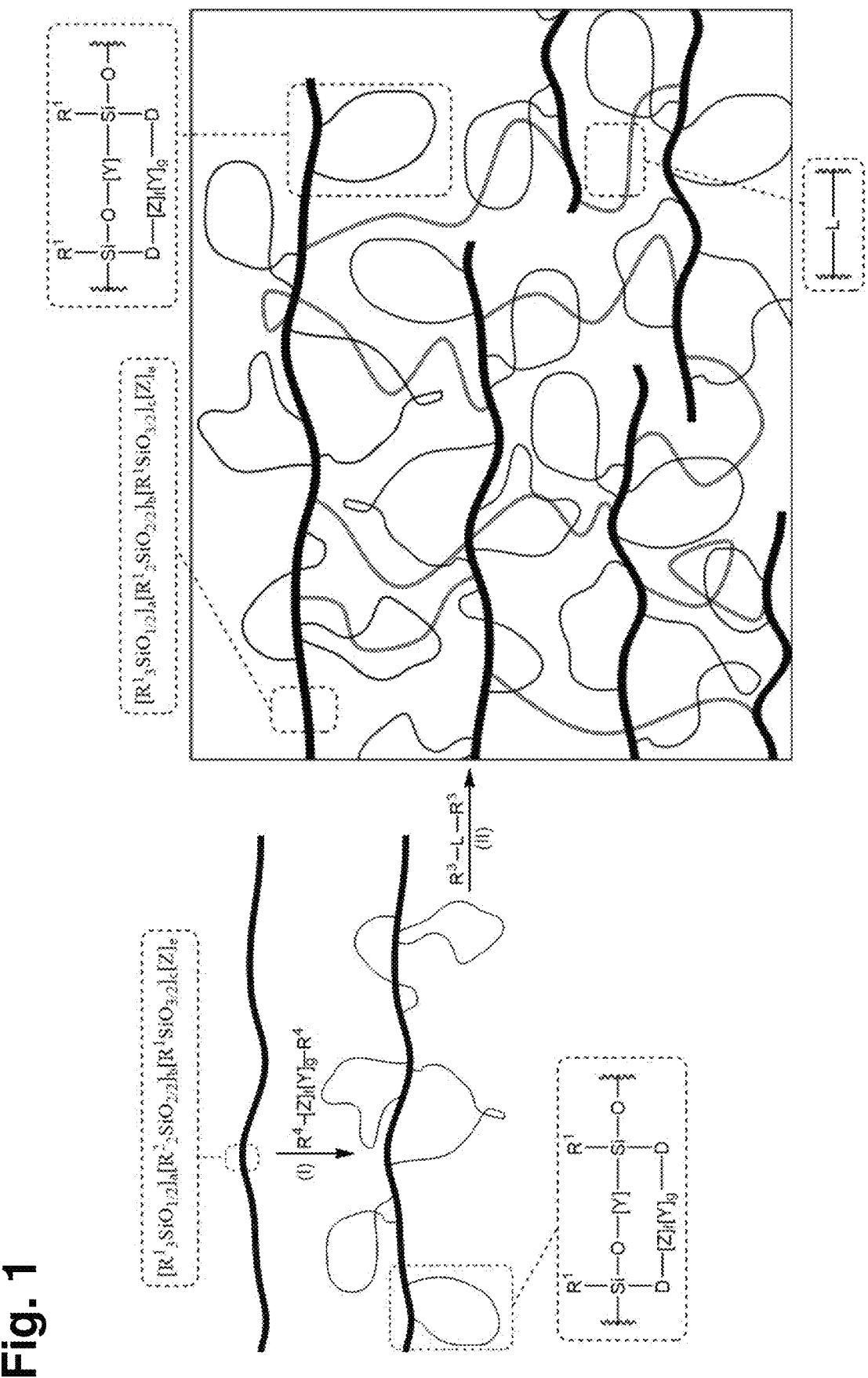
FIG. 1 is a reaction schematic showing networked silicones prepared in accordance with certain embodiments of the disclosure.

A networked silicone is provided. In general, the networked silicone is prepared with particular compositions and/or according to particular methods described below. Accordingly, as will be appreciated by those of skill in the art in view of the description and examples herein, the particular structure, properties, and characteristics of the networked silicone are a function of the components and methods utilized in preparing the same. The networked silicone comprises crosslinked strands of looped organosilicon compounds, as illustrated by the reaction product of reaction (II) in FIG. 1. Without wishing to be bound by theory, it is believed that the particular structure of the networked silicone resists, but allows, strain, and dissipates mechanical energy though a moveable interlocking mechanism that includes a mechanical-type interaction between loops and crosslinking groups bound to the organosilicon strands. As described herein, the networked silicone may be prepared having low-loss and stable optical transmission, high thermal and oxidative stability, and tough mechanical properties manifesting in increased tensile strength, strain, tear strength, modulus, and mechanical energy storage/dissipation before fracture. The networked silicone is not particularly limited, and will be understood by those of skill in the art in view of the compositions and methods described below.

Composition for Preparing the Networked Silicone

A composition for preparing the networked silicone (the "composition") is also disclosed. The composition, and the networked silicone prepared therewith, may be utilized in diverse end use applications. For example, the composition may be utilized to prepare networked silicones as elastomeric compositions, as well as cured products and/or composite articles comprising the same. Such elastomeric compositions may be utilized in or as components of functional devices, such as waveguides for optical components, as described herein.

The composition comprises (A) a looped organosilicon compound, (B) a crosslinking compound, and, optionally, (C) a catalyst, which are each described in further detail below.

Looped Organosilicon Compound (A)

In general, the looped organosilicon compound (A) is an organosilicon compound comprising an organosiloxane-containing backbone having pendant loops, and, in typical embodiments, may be defined as a "brush-type" or "brush" polymer, as will be understood by those of skill in the art in view of the description herein. As described in further detail below, the looped organosilicon compound (A) also comprises at least one cross-linkable group.

The looped organosilicon compound (A) has the general formula (I):

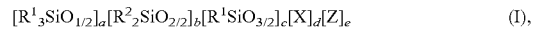

where each X is a looped moiety having the general formula (II):

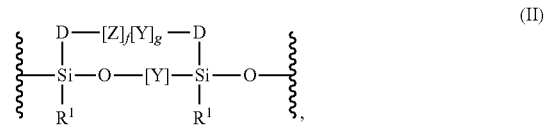

each Y is an independently selected siloxane moiety having the formula $[R^2_iSiO_{(4-i)/2}]_h$, and each Z is an independently selected organic moiety. As described in further detail below, with regard to general formulas (I) and (II), and the various moieties thereof, each $R^1$ is an independently selected hydrocarbyl group; each $R^2$ is independently $R^1$ or a cross-linkable group, with the proviso that at least one $R^2$ is the cross-linkable group; each D is an independently selected divalent linking group; subscripts a, b, c, d, and e are each mole fractions such that a+b+c+d+e=1, with the provisos that 0≤a<1, 0<b<1, 0≤c<1, 0<d<1, and 0≤e<1; subscripts f and g are each independently 0 or 1 with the proviso that f+g>0 in each looped moiety X; each subscript h is independently from 1 to 1000; subscript i is independently selected from 1, 2, and 3 in each moiety indicated by subscript h; and moieties indicated by subscripts a, b, c, d, and e may be in randomized or block form in the looped organosilicon compound (A).

Each $R^1$ is an independently selected hydrocarbyl group. Suitable hydrocarbyl groups may be substituted or unsubstituted. With regard to such hydrocarbyl groups, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., $R^1$ may include one or more heteroatoms (oxygen, sulfur, nitrogen, etc.) within a carbon chain), or both. As such, it will be appreciated that $R^1$ may comprise, or be, a hydrocarbon moiety having one or more substituents in and/or on (i.e., appended to and/or integral with) a carbon chain/backbone thereof, such that $R^1$ may comprise, or be, an ether, an ester, etc.

In general, hydrocarbyl groups suitable for $R^1$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, as well as branched saturated hydrocarbon groups having from 6 to 18 carbon atoms. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. Typically, each $R^1$ is an independently selected substituted or unsubstituted hydrocarbyl group. For example, in some embodiments each $R^1$ is independently selected from unsubstituted hydrocarbyl groups, such as linear or unbranched unsubstituted hydrocarbyl groups.

Each $R^1$ may be the same as or different from any other $R^1$ in the looped organosilicon compound (A). In certain embodiments, each $R^1$ is the same as each other $R^1$ in the looped organosilicon compound (A). In other embodiments, at least one $R^1$ is different from at least one other $R^1$ of the looped organosilicon compound (A). In some embodiments, each $R^1$ is an independently selected hydrocarbyl group having from 1 to 12, alternatively from 1 to 8, alternatively from 1 to 6, carbon atoms. Typically, each $R^1$ is independently selected from alkyl groups, such as methyl groups, ethyl groups, etc. In certain embodiments, each $R^1$ is methyl.

Each $R^2$ is independently $R^1$ or a cross-linkable group, with the proviso that at least one $R^2$ is the cross-linkable group. As such, the looped organosilicon compound (A) comprises at least one cross-linkable group. In some embodiments, the looped organosilicon compound (A) comprises but one cross-linkable group. In other embodiments, the looped organosilicon compound (A) comprises at least two, alternatively at least three, alternatively at least 5, alternatively at least 10 of the cross-linkable group. As will be understood by those of skill in the art, each $R^2$ is independently selected in each moiety indicated by subscripts b and d (i.e., in the backbone of the looped organosilicon compound (A) as well as in siloxane moieties Y, where present, in the looped moiety X shown in general formula (II). Accordingly, the looped organosilicon compound (A) may comprise any number of the cross-linkable group, which can be selected by those of skill in the art based on the particular siloxy units utilized in the various portions of the looped organosilicon compound (A), as will be understood in view of the description and examples herein.

In general, the cross-linkable group comprises a functional group that may be used to crosslink the looped organosilicon compound (A) with a multi-functional cross-linking compound (e.g. via a cross-linking reaction). For example, the cross-linkable group of $R^2$ may comprise, alternatively may be, a group reactive via a substitution reaction, an addition reaction, a coupling reaction, or combinations thereof. Specific examples of such reactions include nucleophilic substitutions, ring-opening additions, alkoxylations and/or transalkoxylations, hydrosilylations, olefin metatheses, condensations, radical couplings and/or polymerizations, and the like, as well as combinations thereof. As such, the cross-linkable group of $R^2$ may comprise, alternatively may be, a functional group that is hydrosilylatable (e.g. a silicon-bonded hydrogen atom, an alkenyl group, an alkynyl group, etc.), condensable (e.g. a hydroxyl group, a carboxyl group, an alkoxysilyl group, a silanol group, an amide group, etc., or a group that may be hydrolyzable and subsequently condensable), displaceable (e.g. a "leaving group" as understood in the art, such as a halogen atom, or other group stable in an ionic form once displaced, or a functional group comprising such a leaving group, such as esters, anhydrides, amides, epoxides, etc.), nucleophilic (e.g. a heteroatom with lone pairs, an anionic or anionizable group, etc., such as a hydroxyl group, an amine group, a thiol group, a silanol group, a carboxylic acid group, group, etc.), electrophilic (e.g. isocyanates, epoxides, etc.), or various combinations thereof. One of skill in the art will appreciate that other cross-linkable groups may also be utilized in or as the cross-linkable group of $R^2$ as well. For example, in certain embodiments, the cross-linkable group of $R^2$ may comprise, alternatively may be, a functional group that is crosslinkable via cycloaddition reaction, such as an azide or alkyne capable of reacting with an alkyne or azide, respectively, in an azide-alkyne cycloaddition reaction.

In certain embodiments, the cross-linkable group of $R^2$ is the hydrosilylatable group and thus selected from olefinically-unsaturated groups (e.g. ethylenically unsaturated groups) and H. In some such embodiments, each hydrosilylatable group represented by $R^2$ is H, such that the looped organosilicon compound (A) is silicon hydride-functional. In other of such embodiments, each hydrosilylatable group represented by $R^2$ is an ethylenically unsaturated group.

Examples of ethylenically unsaturated groups generally include substituted or unsubstituted hydrocarbon groups having at least one alkene or alkyne functional group. For example, in certain embodiments, $R^2$ comprises, alternatively is, an alkenyl group or an alkynyl group. Specific examples thereof include $H_2C=CH-$, $H_2C=CHCH_2-$, $H_2C=CHCH_2CH_2-$, $H_2C=CH(CH_2)_3-$, $H_2C=CH(CH_2)_4-$, $H_2C=C(CH_3)-$, $H_2C=C(CH_3)CH_2-$, $H_2C=C(CH_3)CH_2CH_2-$, $H_2C=C(CH_3)CH_2CH(CH_3)-$, $H_2C=C(CH_3)CH(CH_3)CH_2-$, $H_2C=C(CH_3)C(CH_3)_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. In specific embodiments, $R^2$ comprises, alternatively is, a vinyl group.

In certain embodiments, $R^2$ comprises a hydrosilylatable moiety having the general formula $-[D^2]_k-R^5$, where each $D^2$ is an independently selected divalent group, such as any of those described below; subscript k is 0 or is from 1 to 10; and $R^5$ is a silicon-bonded hydrogen atom or an alkenyl group of formula $-(R^6)CCH_2$, where $R^6$ is a hydrocarbyl group having from 1 to 6 carbon atoms, an alkoxy group, a silyl group, or H. In certain embodiments, $R^6$ is H or $-CH_3$.

In these or other embodiments, subscript k≥1 and $D^2$ is selected from substituted and unsubstituted hydrocarbon groups, siloxane groups, silyl groups, and combinations thereof.

Subscripts a, b, c, d, and e are each mole fractions representing the relative amount of each portion of the looped organosilicon compound (A) of general formula (I), such that a+b+c+d+e=1. In general, 0≤a<1, 0<b<1, 0≤c<1, 0<d<1, and 0≤e<1. However, it will be appreciated that each of these subscripts may vary widely within these ranges, and may be independently selected by those of skill in the art, as described in additional detail below.

As shown in general formulas (I) and (II), the looped organosilicon compound (A) generally comprises [M], [D], and optionally [T] siloxy units. More specifically, as understood in the art, siloxy groups include [M], [D], [T], and [Q] units, which represent structural units of individual functionality present in organopolysiloxane moieties and organopolysiloxanes. More specifically, [M] represents the monofunctional unit of general formula $R_3SiO_{1/2}$; [D] represents the difunctional unit of general formula $R_2SiO_{2/2}$; [T] represents the trifunctional unit of general formula $RSiO_{3/2}$; and [Q] represents the tetrafunctional unit of general formula $SiO_{4/2}$, as shown by the general structural moieties below:

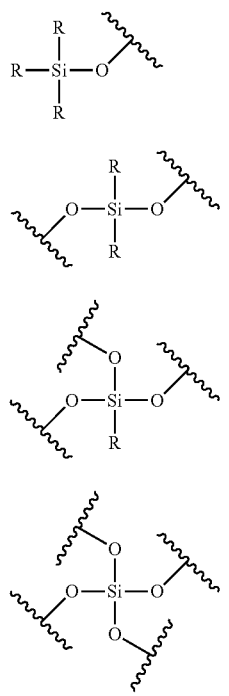

In these general structural moieties, each R is independently a monovalent or polyvalent substituent. As understood in the art, specific substituents suitable for each R are not limited, and may be monoatomic or polyatomic, organic or inorganic, linear or branched, substituted or unsubstituted, aromatic, aliphatic, saturated or unsaturated, and combinations thereof. Typically, each R is independently selected from hydrocarbyl groups and siloxy groups. The hydrocarbyl group(s) represented by R, when present, may be substituted or unsubstituted, and may be aliphatic, aromatic, cyclic, alicyclic, etc., as described above with respect to the examples of hydrocarbyl groups suitable for $R^1$. The siloxy group(s) represented by R, when present, may be substituted or unsubstituted, and may comprise, alternatively may be, any combination of [M], [D], [T], and [Q] units.

With respect to silicon compounds described herein, (e.g. the looped organosilicon compound (A)), the presence and proportion of [M], [D], [T], and/or [Q] units is independently selected, as is the particular substituent for each R of any particular siloxy unit (e.g. those indicated by subscripts a, b, and c in general formula (I), those indicated by subscript h in siloxane moieties Y, etc.). For example, a proportion of [T] and [Q] units of or around 0 is typically selected to increase the linearity of the organopolysiloxane moieties and organopolysiloxanes, such as when the looped organosilicon compound (A) comprises, alternatively is, a linear organopolysiloxane. Such organopolysiloxane moieties and organopolysiloxanes are typically linear or substantially linear, but may include some branching attributable to [T] and/or [Q] units (e.g. where c>0 with respect to general formula (II), where subscript i is 1 and subscript h is >1 for any given siloxane moiety Y, etc.). Conversely, the proportion of [T] and/or [Q] units is selected to be greater than 0 when an organopolysiloxane moiety or organopolysiloxane is a resin. Accordingly, one of skill in the art will select the composition of the siloxane segments to control the composition of the silicon compounds described herein in general, and thus the looped organosilicon compound (A) in particular, e.g. based on a desired property of a particular looped organosilicon compound (A) or a networked silicone to be prepared therewith.

It will be appreciated by those of skill in the art that the siloxy moieties indicated by subscripts a, b, and c in general formula (I) correspond to [M], [D], and [T] siloxy units, respectively, as introduced and described above. Typically, the looped organosilicon compound (A) comprises repeating [D] units, i.e., subscript b>0. For example, in certain embodiments, subscript b is a value of from greater than 0 to less than 1 (i.e., 0<b<1), alternatively from 0.3 to less than 1 (i.e., 0.3≤b<1), such as from 0.3 to 0.9999, alternatively from 0.3 to 0.999, alternatively from 0.3 to 0.99, alternatively from 0.3 to 0.9, alternatively from 0.5 to 0.999, alternatively from 0.6 to 0.999, alternatively from 0.7 to 0.99, alternatively from 0.8 to 0.99, alternatively from 0.85 to 0.99, alternatively from 0.9 to 0.99. Subscript a is typically a value of from 0 to less than 1 (i.e., 0≤a<1), alternatively from 0 to 0.1 (i.e., 0≤a≤0.1), such as from 0 to 0.099, alternatively from 0 to 0.09, alternatively from 0 to 0.085, alternatively from 0 to 0.08, alternatively from 0 to 0.075, alternatively from 0 to 0.07, alternatively from 0 to 0.065, alternatively from 0 to 0.06, alternatively from 0 to 0.055, alternatively from 0 to 0.05, alternatively from 0.001 to 0.05, alternatively from 0.002 to 0.05, alternatively from 0.005 to 0.01. Subscript c is typically a value of from 0 to less than 1 (i.e., 0≤c<1), alternatively from 0 to 0.7 (i.e., 0≤c≤0.7), such as from 0 to 0.5, alternatively from 0 to 0.4, alternatively from 0 to 0.3, alternatively from 0 to 0.2, alternatively from 0 to 0.1, alternatively from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001. In certain embodiments, the looped organosilicon compound (A) comprises a linear siloxane segment, where 0.9≤b<1, 0≤a≤0.1, and subscript c is 0. When the organopolysiloxane comprises repeating [D] units, the number of specific [D]

units (i.e., the degree of polymerization, DP) in any one siloxane segment is not limited, as described in further detail below.

Subscript d, which represents the proportion of looped moieties X present in the looped organosilicon compound (A), is selected such that 0<d<1. As such, the looped organosilicon compound (A) comprises at least one looped moiety X, but does not consist solely of looped moieties X. The particular number of looped moieties X will be independently selected by those of skill in the art in view of the description herein. Typically, subscript d is from 0.0001 to 0.97 (i.e., 0<d<0.97), alternatively from 0.005 to 0.95 (i.e., 0005≤d≤0.95), such as from 0.001 to 0.95, alternatively from 0.05 to 0.95, alternatively from 0.05 to 0.9, alternatively from 0.1 to 0.9, alternatively from 0.2 to 0.9, alternatively from 0.3 to 0.9, alternatively from 0.4 to 0.9, alternatively from 0.5 to 0.9, alternatively from 0.6 to 0.9, alternatively from 0.6 to 0.8, alternatively from 0.6 to 0.8. In certain embodiments, subscript d is from 0.005 to 0.8, such as from 0.005 to 0.7, alternatively from 0.01 to 0.7, alternatively from 0.05 to 0.7, alternatively from 0.05 to 0.6, alternatively from 0.05 to 0.5, alternatively from 0.05 to 0.4, alternatively from 0.05 to 0.3. In some embodiments, subscript d is from 0.1 to 0.7, such as from 0.2 to 0.7, alternatively from 0.2 to 0.6.

Subscript e represents the proportion of organic moieties Z present in the looped organosilicon compound (A). Typically, subscript e is a value of from 0 to less than 1 (i.e., 0≤e<1), alternatively from 0 to 0.1 (i.e., 0≤e≤0.1), such as from 0 to 0.09, alternatively from 0 to 0.075, alternatively from 0 to 0.05, alternatively from 0 to 0.025, alternatively from 0 to 0.009, alternatively from 0 to 0.001, alternatively from 0 to 0.0001.

The portion of the looped organosilicon compound (A) represented by the moieties indicated by subscripts a, b, c, and d (i.e., the siloxane moieties) may be collectively defined or otherwise referred to herein as the silicone portion of the looped organosilicon compound (A). Likewise, the portion of the looped organosilicon compound (A) represented by the organic moieties Z indicated by subscript e may be collectively defined or otherwise referred to herein as the organic portion of the looped organosilicon compound (A). However, it is to be appreciated that the moieties indicated by subscripts a, b, c, d, and e may be in randomized or block form in the looped organosilicon compound (A) (i.e., in any order(s), arrangement(s), repeating segment(s), non-repeating segment(s), etc., or combinations thereof).

For example, in certain embodiments, the looped organosilicon compound (A) comprises a silicone portion having the general formula (III):

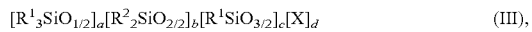

$[R^1_3SiO_{1/2}]_a[R^2_2SiO_{2/2}]_b[R^1SiO_{3/2}]_c[X]_d$ (III), where each variable is as described herein. In specific embodiments, the looped organosilicon compound (A) itself is a polyorganosiloxane compound having the general formula (III). However, in some of these embodiments, subscript e is 0 with the proviso that at least one $R^1$ is a divalent linking group bonded to an organic moiety Z, or where one $R^2$ is such an $R^1$, such that backbone of the looped organosilicon compound (A) still comprises an organic portion having one or more organic moieties Z (i.e., where such organic moieties Z are pendant rather than integral with the backbone itself). Regardless, in either of such embodiments, subscript e is 0 such that the backbone of the looped organosilicon compound (A) does not comprise any of the organic moieties Z.

With regard to the looped moiety X, as described by general formula (II) introduced above, each Y is independently a siloxane moiety of formula $[R^2_iSiO_{(4-i)/2}]_h$. It will be appreciated by those of skill in the art that each subscript h represents the number of siloxy units in, and thus the degree of polymerization (DP) of, the particular siloxane moiety Y, whereas subscript i represents the substitution/type of each siloxy unit indicated by subscript h.

In general, each subscript h is at least 1, alternatively is greater than 1. Typically, each subscript h is from 1 to 1000. For example, in certain embodiments, subscript h is from 1 to 400, alternatively from 1 to 300, alternatively from 1 to 200, alternatively of from 1 to 100, alternatively of from 1 to 50, alternatively of from 1 to 25, alternatively of from 1 to 10, alternatively of from 2 to 10. In particular embodiments, subscript h is from 200 to 1000, alternatively from 300 to 1000, alternatively from 400 to 1000, alternatively from 500 to 1000, alternatively from 600 to 1000, alternatively of from 700 to 1000, alternatively of from 800 to 1000, alternatively of from 900 to 1000. In some embodiments, subscript h is from 20 to 1000, such as from 50 to 1000, alternatively from 50 to 900, alternatively from 50 to 800, alternatively from 100 to 800, alternatively of from 100 to 600, alternatively of from 150 to 600. As such, each siloxane moiety Y has an independent DP, which may be individually selected (e.g. based on a desired loop size, range of different loop sizes, etc.). More specifically, each siloxane moiety Y has a DP of from 1 to 1000. Within this range, in particular embodiments, each siloxane moiety Y has a DP of 1000 or less, but greater than 2, alternatively greater than 10, alternatively greater than 20, alternatively greater than 50, alternatively greater than 100, alternatively greater than 150, alternatively greater than 200, alternatively greater than 250, alternatively greater than 500. It is to be appreciated, however, that DP values outside of these ranges may also be utilized. Moreover, as each siloxane moiety Y is independently selected, the DP of each siloxane moiety Y need not be the same as each other, but rather may instead be the same as or different from the DP of any other siloxane moiety Y of the looped organosilicon compound (A).

Subscript i is independently selected from 1, 2, and 3 in each moiety indicated by subscript h. As will be understood by those of skill in the art, each siloxane moiety Y may comprise h number of siloxy units, which may independently be D units (i.e., where i=2), M units (i.e., where i=3), or T units (i.e., where i=1). The proportion of each such units within any given siloxane moiety Y is independently selected, e.g. based on the properties of such units and proportions described above with respect to subscripts a, b, and c above.

With continued regard to the looped moiety X, and thus general formula (II), each D is an independently selected divalent linking group. In certain embodiments, each D comprises, alternatively is, a divalent organic and/or silicon linking group, such as those selected from hydrocarbon linking groups, silyl and/or organosilyl linking groups, siloxane and/or organosiloxane linking groups, and the like, or combinations thereof. In some embodiments, D comprises, alternatively is, a substituted or unsubstituted hydrocarbon group (e.g. a $C_1$-$C_{18}$ hydrocarbon group). In particular embodiments, D comprises, alternatively is, an alkylene group having the general formula $-(CH_2)_n-$, where subscript n is ≥1, such as from 1 to 18, alternatively from 1 to 16, alternatively from 1 to 12, alternatively from 1 to 10, alternatively from 1 to 8, alternatively from 1 to 6, alternatively from 2 to 6. In particular embodiments, subscript n is 3. In specific embodiments, each D comprises, alternatively is, a divalent hydrocarbyl group having the formula-$(CH_2)_2$—, —$(CH_2)_3$—, —$CH(CH_3)CH_2$—, or —$CH_2CH(CH_3)CH_2$—.

Subscripts f and g are each independently 0 or 1, with the proviso that f+g>0 in each looped moiety X. Said differently, with reference to general formula (II), each looped moiety X comprises at least one of the organic moiety Z indicated by subscript f and the siloxane moiety Y indicated by subscript g. In certain embodiments, each subscript f is 1 such that the looped moiety X comprises the organic moiety Z indicated by subscript f. In particular embodiments, each subscript g is 1 such that the or each looped moiety X comprises the siloxane moiety Y indicated by subscript g. In certain embodiments, each subscript f is 1 and each subscript g is 1, such that the or each looped moiety X comprises the organic moiety Z indicated by subscript f and also the siloxane moiety Y indicated by subscript g. It is to be appreciated, however, that each looped moiety X is independently selected and thus may be the same as, or different from, and other each looped moiety X in the looped organosilicon compound (A) (e.g. with respect to the value of subscripts f and/or g in each looped moiety X, the particular siloxane moiety Y and/or organic moiety Z utilized in any looped moiety X, etc.).

As will be appreciated by those of skill in the art, the looped organosilicon compound (A) may be described in terms of the total number of repeating siloxane units or siloxy groups therein, such is in terms of the overall DP of the silicone portion thereof (e.g. as a whole), as represented generally be subscripts a, b, c, and d, but also by the number of siloxane moieties Y and the subscripts h thereof in the looped moieties X. For example, in certain embodiments, the looped organosilicon compound (A) has an overall DP of from 1 to 5,000,000, alternatively from 1 to 4,000,000, alternatively from 1 to 3,000,000, alternatively from 1 to 2,000,000, alternatively from 1 to 1,000,000. In these or other embodiments, the looped organosilicon compound (A) has an overall DP greater than 1,000, alternatively greater than 5,000, alternatively greater than 10,000, alternatively greater than 50,000, alternatively greater than 100,000, alternatively greater than 500,000. In some embodiments, the looped organosilicon compound (A) has an overall DP less than 100,000, alternatively less than 50,000, alternatively less than 10,000, alternatively less than 5,000, alternatively less than 2,500, alternatively less than 1,000. In specific embodiments, the looped organosilicon compound (A) has an overall DP of from 50 to 1000, such as from 60 to 999, alternatively from 70 to 999, alternatively from 80 to 999, alternatively from 90 to 999, alternatively of from 90 to 900, alternatively from 90 to 800, alternatively from 90 to 700, alternatively from 90 to 600, alternatively 90 to 500, alternatively from 90 to 400, alternatively from 90 to 300, alternatively from 90 to 200.

As introduced above with regard to the looped organosilicon compound (A) as a whole (i.e., as described by general formula (I)) and certain portions thereof, such as the looped moieties X described by general formula (II), each Z is an independently selected organic moiety. The organic moieties Z are not particularly limited, and may be any organic moiety suitable for use in and/or with the compounds, compositions, and methods described herein. In general, the organic moieties Z each comprise a monovalent organic group such as any of those described herein with regard to hydrocarbyl groups $R^1$, or a divalent organic group, such as any of those described herein with regard to linking groups D, or an organic polymer moiety, as described below.

In certain embodiments, each organic moiety Z comprises, alternatively is, an organic polymer moiety, i.e., an organic polymer or combination of organic polymers grafted onto or reacted with the silicone portion of the looped organosilicon compound (A). Examples of such organic polymers include polyethers, polyacrylates, polyesters, polycarbonates, and the like, as well as combinations thereof. However, as will be understood in view of the description herein, the organic polymer moiety, and thus the organic moieties Z, may comprise or be any organic polymer moiety comprising any organic polymer, or even merely at least one organic polymer group.

Specific examples of organic polymer groups include polyether groups, polyacrylate groups, polyester groups, polycarbonate groups, alkylaluminoxane groups, alkylgermoxane groups, polythioester groups, polythioether groups, polyacrylonitrile groups, polyacrylamide groups, epoxy groups, polyurethane groups, polyurea groups, polyacetal groups, polyolefin groups, polyvinyl alcohol groups, polyvinyl ester groups, polyvinyl ether groups, polyvinyl ketone groups, polyisobutylene groups, polychloroprene groups, polyisoprene groups, polybutadiene groups, polyvinylidiene groups, polyfluorocarbon groups, polychlorinated hydrocarbon groups, polyalkyne groups, polyamide groups, polyimide groups, polyimidazole groups, polyoxazole groups, polyoxazine groups, polyoxidiazole groups, polythiazole groups, polysulfone groups, polysulfide groups, polyketone groups, polyetherketone groups, polyanhydride groups, polyamine groups, polyimine groups, polyphosphazene groups, polysaccharide groups, polypeptide groups, polyisocyanate groups, polylactone groups, cellulosic groups, and combinations thereof.

In certain embodiments, the organic polymer moiety of Z comprises a combination of polymers, i.e., is a copolymer moiety comprising at least two different polymer groups. In such embodiments, each of the polymer groups may be independently selected, and may include any of the polymers or polymer groups described herein.

In specific embodiments, the looped organosilicon compound (A) has the general formula (IV):

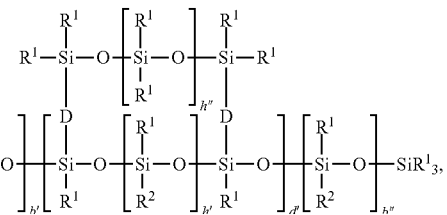

(IV)

where each $R^1$, $R^2$, and D are as defined above, subscript b' is from 0 to 100,000, subscript b" is from 0 to 100,000, subscript d' is from 1 to 25,000, subscript h' is independently from 1 to 1000 in each moiety indicated by subscript d', and subscript h" is independently from 1 to 200,000 in each moiety indicated by subscript d', and moieties indicated by subscripts b', d', and b" may be in randomized or block form in the looped organosilicon compound (A). In some such embodiments, subscript h" is from 5 to 20,000, alternatively from 10 to 10,000, alternatively from 20 to 5,000, alternatively from 50 to 1000, alternatively from 50 to 900, alternatively from 50 to 800, alternatively from 50 to 750, alternatively from 50 to 600, alternatively from 50 to 500. In specific embodiments, subscript h" is from 100 to 1000, such as from 100 to 900, alternatively from 100 to 800, alternatively from 100 to 750, alternatively from 100 to 600, alternatively from 100 to 500, alternatively from 150 to 500, in each moiety indicated by subscript d'.

In particular embodiments, the looped organosilicon compound (A) has the general formula (IV), where each $R^2$ is independently $R^1$ or a hydrosilylatable group selected from an alkenyl group and H, with the proviso that at least one $R^2$ is the hydrosilylatable group. In these or other embodiments, each D is independently a divalent hydrocarbon group having from 2 to 10 carbon atoms. In specific embodiments, the looped organosilicon compound (A) has the general formula (IV), where: each $R^1$ is methyl; each D is selected from —$(CH_2)_2$—, —$(CH_2)_3$—, —$CH(CH_3)CH_2$—, and —$CH_2CH(CH_3)CH_2$—; b'+h'+b"=20-200,000, alternatively from 20-5000; each hydrosilylatable group is vinyl or allyl; and/or subscript h" is from 5 to 20,000, alternatively from 50 to 1000, in each moiety indicated by subscript d'.

Crosslinking Compound (B)

In general, the crosslinking compound (B) comprises at least two functional groups that are reactive with the crosslinkable group $R^2$ of the looped organosilicon compound (A), and is otherwise not particularly limited. Typically, the crosslinking compound (B) has the general formula $R^3$-L-$R^3$, where L is a linking group and each $R^3$ is an independently selected functional group reactive with the crosslinkable group $R^2$ of the looped organosilicon compound (A).

The linking group L is not limited, and may comprise siloxane segments and/or organic segments. However, it will be appreciated that any number of siloxane segments and/or organic segments may be utilized in or as the linking group L, in any order or combinations of orders. As such, linking group L, and thus the crosslinking compound (B), may be a homopolymer or a copolymer (e.g. block copolymer, random copolymer, alternate copolymer, etc.).

Suitable siloxane segments include those having the formula $[R^1_2SiO_{2/2}]_j$, where each $R^1$ is as defined above and subscript j represents the number of individual siloxane or siloxy units (i.e., D units) in the individual siloxane segment. In general, each subscript j is at least 1, alternatively is greater than 1. Typically, each subscript j is from 1 to 10,000, such as from 2 to 5000, alternatively from 2 to 2000, alternatively from 5 to 1000, alternatively from 10 to 750, alternatively from 20 to 500. For example, in certain embodiments, subscript j is from 1 to 400, alternatively from 1 to 300, alternatively from 1 to 200, alternatively of from 1 to 100, alternatively of from 1 to 50, alternatively of from 1 to 25, alternatively of from 1 to 10, alternatively of from 2 to 10. In particular embodiments, subscript j is from 20 to 10,000, alternatively from 20 to 5,000, alternatively from 20 to 2,500, alternatively from 20 to 1000, alternatively from 50 to 1000, alternatively from 100 to 1000, alternatively from 200 to 1000, alternatively from 400 to 1000, alternatively from 500 to 1000, alternatively from 600 to 1000, alternatively of from 700 to 1000, alternatively of from 800 to 1000, alternatively of from 900 to 1000.

In certain embodiments, the linking group L of the crosslinking compound (B) is selected to comprise siloxane segments as described above, and the looped organosilicon compound (A) has the general formula (IV). In some such embodiments, subscript h" is a lower value than subscript j (i.e., h"<j). In certain embodiments, subscript h" is less than or equal to j (i.e., h"≤j). In some embodiments, subscript h" is a value greater than subscript j (i.e., h">j). In particular embodiments, subscript h" is greater than or equal to subscript j (i.e., h"≥j).

The linking group L may comprise but 1 siloxane segment (e.g. when the linking group L is itself a siloxane polymer, such as a polyorganosiloxane), or more than 1 siloxane segment (e.g. when the linking group L is a silicon-organic copolymer). As such, each siloxane segment of the linking group L has an independent DP, which may be individually selected. In certain embodiments, each siloxane segment of L has a DP of from 2 to 2000, such as from 5 to 1000, alternatively from 10 to 750, alternatively from 20 to 500. In particular embodiments, the linking group L is itself a siloxane polymer comprising a single siloxane segment having a DP of from 1 to 10,000, alternatively of from 5 to 1000. It is to be appreciated, however, that DP values outside of these ranges may also be utilized. Moreover, as each siloxane segment of L is independently selected, the DP of each siloxane segment need not be the same as each other, but rather may instead be the same as or different from the DP of any other siloxane segment of L of the crosslinking compound (B). For example, in certain embodiments, the crosslinking compound (B) has an overall DP of from 1 to 5000, such as from 2 to 2000. In these or other embodiments, the crosslinking compound (B) has an overall DP greater than 100, alternatively greater than 200, alternatively greater than 500, alternatively greater than 1000, alternatively greater than 2000, alternatively greater than 3000, alternatively greater than 4000, alternatively greater than 5000. In some embodiments, the crosslinking compound (B) has an overall DP less than 1000, alternatively less than 750, alternatively less than 500, alternatively less than 250. In specific embodiments, the crosslinking compound (B) has an overall DP of from 10 to 1000, such as from 10 to 800, alternatively from 20 to 600, alternatively from 20 to 400, alternatively from 20 to 200, alternatively of from 20 to 100.

Suitable organic segments may comprise, alternatively may be, any of the organic moieties Z described above. In certain embodiments, each organic segment comprises, alternatively is, an organic polymer segment, i.e., an organic polymer or combination of organic polymers bonded to reactive functional groups $R^3$ and/or grafted onto a silicone segment of the crosslinking compound (B). Specific examples of suitable organic polymer segments include an alkylaluminoxane segment, an alkylgermoxane segment, a polythioester segment, a polyether segment, a polythioether segment, a polyacrylate segment, a polyacrylonitrile segment, a polyacrylamide segment, a polyester segment, an epoxy segment, a polyurethane segment, a polyurea segment, a polyacetal segment, a polyolefin segment, a polyvinyl alcohol segment, a polyvinyl ester segment, a polyvinyl ether segment, a polyvinyl ketone segment, a polyisobutylene segment, a polychloroprene segment, a polyisoprene segment, a polybutadiene segment, a polyvinylidiene segment, a polyfluorocarbon segment, a polychlorinated hydrocarbon segment, a polyalkyne segment, a polyamide segment, a polyimide segment, a polyimidazole segment, a polyoxazole segment, a polyoxazine segment, a polyoxidiazole segment, a polythiazole segment, a polysulfone segment, a polysulfide segment, a polyketone segment, a polyetherketone segment, a polyanhydride segment, a polyamine segment, a polyimine segment, a polyphosphazene segment, a polysaccharide segment, a polypeptide segment, a polyisocyanate segment, a cellulosic segment, and combinations thereof. Each organic segment may independently comprise at least one, alternatively, at least two organic polymer segments. When there are a plurality of polymer segments in the organic segment of the crosslinking compound (B), each polymer segment may be independently selected.

In general, the reactive functional groups $R^3$ are selected based on the cross-linkable group $R^2$ of the organosilicon compound (A), such that the crosslinking compound (B) is reactive with the looped organosilicon compound (A) in a crosslinking reaction involving cross-linkable group $R^2$ and reactive functional groups $R^3$. It is to be appreciated that each $R^3$ is independently selected, such that reactive functional groups $R^3$ may be the same as or different from each other.

For example, each of the reactive functional groups $R^3$ may comprise, alternatively may be, a group reactive via a substitution reaction, an addition reaction, a radical reaction, a coupling reaction, or combinations thereof. Specific examples of such reactions include nucleophilic substitutions, ring-opening additions, alkoxylations and/or transalkoxylations, hydrosilylations, olefin metatheses, condensations, radical couplings and/or polymerizations, and the like, as well as combinations thereof. As such, each of the reactive functional groups $R^3$ may comprise, alternatively may be, a functional group that is hydrosilylatable (e.g. a silicon-bonded hydrogen atom, an alkenyl group, an alkynyl group, etc.), condensable (e.g. a hydroxyl group, a carboxyl group, an alkoxysilyl group, a silanol group, an amide group, etc.), displaceable (e.g. a "leaving group" as understood in the art, such as a halogen atom, or other group stable in an ionic form once displaced, or a functional group comprising such a leaving group, such as esters, anhydrides, amides, epoxides, etc.), nucleophilic (e.g. a heteroatom with lone pairs, an anionic or anionizable group, etc., such as a hydroxyl group, an amine group, a thiol group, a silanol group, a carboxylic acid group, group, etc.), electrophilic (e.g. isocyanates, epoxides, etc.), or various combinations thereof.

In certain embodiments, the reactive functional groups $R^3$ are each selected from hydrosilylatable groups, and thus comprises, alternative is, an ethylenically unsaturated group or a Silicon-bonded hydrogen atom. In some such embodiments, each $R^3$ comprises, alternatively is, a silicon-bonded hydrogen atom, such that the crosslinking compound (B) is silicon hydride-functional. In other of such embodiments, each $R^3$ comprises, alternatively is, an ethylenically unsaturated group, such as any of those described above with respect to the cross-linkable group $R^2$ of the organosilicon compound (A).

In certain embodiments, each $R^3$ comprises a hydrosilylatable moiety having the general formula $\text{-}[D^3]_I\text{---}R^7$, where each $D^3$ is an independently selected divalent group, such as any of those described herein; subscript I is 0 or is from 1 to 10; and $R^7$ is a silicon-bonded hydrogen atom or an alkenyl group of formula $\text{---}(R^8)CCH_2$, where $R^8$ is a hydrocarbyl group having from 1 to 6 carbon atoms, an alkoxy group, a silyl group, or H. In certain embodiments, $R^8$ is H or $\text{---}CH_3$. In these or other embodiments, subscript I21 and $D^3$ is selected from substituted and unsubstituted hydrocarbon groups, siloxane groups, silyl groups, and combinations thereof.

In specific embodiments, the crosslinking compound (B) has the general formula $R^3Si(R^1)_2O[R^1{}_2SiO_{2/2}]_j(R^1)_2SiR^3$, where each $R^1$, $R^3$, and subscript j is as defined above. In some such embodiments, each $R^3$ is an olefinically-unsaturated group or H. In certain such embodiments, each $R^3$ is H. In these or other embodiments, subscript j is from 20 to 500. In particular such embodiments, each $R^1$ is methyl.

Catalyst (C)

As introduced above, the composition optionally includes the catalyst (C). The inclusion of the catalyst (C) in the composition, and the particular type or specific compound(s) selected for use in or as the catalyst (C), will be readily selected by those of skill in the art based on the particular looped organosilicon compound (A) and crosslinking compound (B) selected. More specifically, the catalyst (C) is selected to catalyze the crosslinking of the looped organosilicon compound (A) with the crosslinking compound (B), and thus will be selected based on the particular cross-linkable group $R^2$ and reactive functional groups $R^3$ utilized, the type of crosslinking reaction desired, the particular crosslinking reaction conditions to be employed, etc. As such, the catalyst (C) is not particularly limited, and may comprise or be any compound suitable for facilitating the crosslinking the looped organosilicon compound (A) with the crosslinking compound (B) (e.g. via reaction of/including cross-linkable group $R^2$ and reactive functional groups $R^3$), as will be understood by one of skill in the art in view of the description herein. For example, in certain embodiments, the catalyst (C) is selected from those facilitating reactions including hydrosilylation, condensation, displacement, acid-base, ring-opening, nucleophilic substitution, radical coupling, cycloaddition, and the like, as well as combinations of such reactions.

In certain embodiments, the catalyst (C) is a metal-based catalyst (i.e., comprises a metal, such as a transition metal), such as those comprising Pt, Ir, Ru, Pd, Fe, Sn, Ti, Al, Zr, Hf, etc. The particular catalyst is not limited, and will be selected by those of skill in the art to catalyze a particular type of reaction to crosslink the looped organosilicon compound (A) with the crosslinking compound (B). For example, in certain embodiments, the catalyst (C) may comprise, alternatively consist essentially of, alternatively consist of hexachloroplatinic acid, which may be utilized to crosslink compounds (A) and (B) via a hydrosilylation reaction. In these or other embodiments, the catalyst (C) may comprise, alternatively consist essentially of, alternatively consist of dibutyltin dilaurate, which may be utilized to crosslink compounds (A) and (B) via a silanol condensation reaction. In these or other embodiments, the catalyst (C) may comprise, alternatively consist essentially of, alternatively consist of a low-valent Ti-based catalyst, which may be utilized to crosslink compounds (A) and (B) via a McMurry-type coupling reaction. In certain embodiments, the catalyst (C) may comprise, alternatively consist essentially of, alternatively consist of a Cu-based catalyst, which may be utilized to crosslink compounds (A) and (B) via a copper-catalyzed azide-alkyne cycloaddition (CuAAC) reaction.

In some embodiments, the catalyst (C) comprises, alternatively is, an inorganic or organic base or acid (i.e., an acid-type or base-type catalyst). In such embodiments, the catalyst (C) may comprise metal atoms, alternatively may be substantially free from, alternatively may be free from metal atoms. As understood by those of skill in the art, acid/base-type catalyst may be utilized to crosslink the looped organosilicon compound (A) with the crosslinking compound (B) via condensation reactions, acid-base reactions, ring opening reaction, nucleophilic substitution reactions, etc. Examples of acid/base-type catalysts suitable for use in or as the catalyst (C) include lithium hydroxide (LiOH), sodium hydroxide (NaOH), potassium hydroxide (KOH), cesium hydroxide (CsOH), tetramethylammonium hydroxide $((CH_3)_4NOH)$, 1,8-diazabicyclo [5.4.0]undec-7-ene (DBU), sulfonic acids, sulfuric acid $(H_2SO_4)$, carboxylic acids, mineral acids, and the like, as well as derivatives, modifications, and combinations thereof.

In certain embodiments, the catalyst (C) comprises, alternatively is, a compound that generates a free radical, an acid, or a base, e.g. when exited by a certain type of energy source (e.g. heat, UV light, etc.), via a chemical reaction, etc. Examples of such compounds include (2,2,6,6-Tetramethylpiperidin-1-yl)oxyl (TEMPO), triazines, thiazines such as 10-phenylphenothiazine, 9,9'-bixanthene-9,9'-diol, 2,2-dimethoxy-2-phenylacetophenone, peroxides such as 2,5-dimethyl-2,5-di-(tert-butylperoxy)hexane (DBPH), and the like, as well as derivatives, modifications, and combinations thereof. In certain embodiments, the catalyst (C) may comprise, alternatively consist essentially of, alternatively consist of a fac-tris(2-phenylpyridine)-based catalyst, which may be utilized to crosslink compounds (A) and (B) via a reaction comprising light-mediated radical generation.

In specific embodiments, the catalyst (C) comprises, alternatively is, a hydrosilylation catalyst. The hydrosilylation catalyst is not limited and may be any known hydrosilylation catalyst for catalyzing hydrosilylation reactions. Combinations of different hydrosilylation catalysts may be utilized. In certain embodiments, the hydrosilylation catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation catalyst.

Additional examples of catalysts suitable for the hydrosilylation catalyst include rhenium (Re), molybdenum (Mo), Group IV transition metals (i.e., titanium (Ti), zirconium (Zr), and/or hafnium (HO), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation catalyst.

The hydrosilylation catalyst may be in any suitable form. For example, the hydrosilylation catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation catalyst may be in or on a solid carrier. Examples of carriers include activated carbons, silicas, silica aluminas, aluminas, zeolites and other inorganic powders/particles (e.g. sodium sulphate), and the like. The hydrosilylation catalyst may also be disposed in a vehicle, e.g. a solvent which solubilizes the hydrosilylation catalyst, alternatively a vehicle which merely carries, but does not solubilize, the hydrosilylation catalyst. Such vehicles are known in the art.

In specific embodiments, the hydrosilylation catalyst comprises platinum. In these embodiments, the hydrosilylation catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds.

Complexes of platinum with organopolysiloxanes suitable for use as the hydrosilylation catalyst include 1,3-diethenyl-1,1,3,3-tetramethyldisiloxane complexes with platinum. These complexes may be microencapsulated in a resin matrix. Alternatively, the hydrosilylation catalyst may comprise 1,3-diethenyl-1,1,3,3-tetramethyldisiloxane complex with platinum. The hydrosilylation catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$, where COD represents cyclooctadiene.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

In particular embodiments, the catalyst (C) comprises a phase transfer catalyst. Examples of phase transfer catalysts include tetraalkyl ammonium and/or phosphonium salts, such as tetrabutyl ammonium bromide, tetrabutyl phosphonium bromide, and the like, as well as combinations thereof.

It is to be appreciated that the catalyst (C) may itself comprise more than one type of catalyst and/or the reaction may utilize more than one type of catalyst (C), such as two, three, or more different catalysts (C).

Other Components

In the composition, the looped organosilicon compound (A) the crosslinking compound (B), and the catalyst (C), when utilized, may be used alone or together (e.g. neat or in combination with a carrier vehicle), and may be supplemented by at least one auxiliary component, or may act as an auxiliary to at least one other component, optionally in the presence of one of more additives (e.g. agents, adjuvants, ingredients, modifiers, etc.).

In certain embodiments, the composition further comprises one or more additional components, such as one or more additives. It is to be appreciated that such additives may be classified under different terms of art and just because an additive is classified under such a term does not mean that it is thusly limited to that function. Moreover, some of these additives may be present in a particular component of the composition, or instead may be incorporated when forming the composition. Typically, the composition may comprise any number of additives, e.g. depending on the particular type and/or function of the same in the composition. For example, in certain embodiments, the composition may comprise one or more additives comprising, alternatively consisting essentially of, alternatively consisting of: a carrier (e.g. a carrier vehicle, such as a solvent, diluent, etc.); a filler; a filler treating agent; a surface modifier; a surfactant; a rheology modifier; a viscosity modifier; a binder; a thickener; a tackifying agent; an adhesion promotor; a defoamer; a compatibilizer; an extender; a plasticizer; an end-blocker; a reaction inhibitor; a drying agent; a water release agent; a colorant (e.g. a pigment, dye, etc.); an anti-aging additive; a biocide; a flame retardant; a corrosion inhibitor; a catalyst inhibitor; a UV absorber; an anti-oxidant; a light-stabilizer; a catalyst (e.g.

other than the catalyst (C)), procatalyst, or catalyst generator; an initiator (e.g. a heat activated initiator, an electromagnetically activated initiator, etc.); a photoacid generator; a heat stabilizer; and the like, as well as derivatives, modifications, and combinations thereof.

In certain embodiments, the composition comprises a filler, such as electrically and/or thermally conductive or non-conductive fillers, mineral filler, etc. Examples of electrically conductive fillers include those comprising a metal or a conductive non-metal, or metal or non-metal particles having an outer surface of a metal (e.g. a noble metal such as silver, gold, platinum, palladium, and alloys thereof, or a base metal such as nickel, aluminum, copper, or steel), including those also comprising a core of particles consisting of copper, solid glass, hollow glass, mica, nickel, ceramic fiber, or polymerics such as polystyrene, polymethylmethacrylate, etc. Example of thermally conductive fillers include those comprising aluminum, copper, gold, nickel, silver, alumina, magnesium oxide, beryllium oxide, chromium oxide, titanium oxide, zinc oxide, barium titanate, diamond, graphite, carbon or silicon nano-sized particles, boron nitride, aluminum nitride, boron carbide, titanium carbide, silicon carbide, and tungsten carbide. Examples of mineral fillers include titanium dioxide, aluminum trihydroxide (also called ATH), magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminum oxide, antimony pentoxide, antimony trioxide, beryllium oxide, chromium oxide, iron oxide, lithopone, boric acid or a borate salt such as zinc borate, barium metaborate or aluminum borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminum flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, ceramic or glass beads, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulphide, wollastonite, and the like, as well as derivatives, modifications, and combinations thereof.

In certain embodiments, the composition comprises one or more reinforcing fillers, non-reinforcing fillers, or a mixture thereof. Examples of reinforcing fillers include of finely divided fillers such as high surface area fumed and precipitated silicas, including rice hull ash and, to a degree, calcium carbonate. Examples of non-reinforcing fillers include finely divided fillers such as crushed quartz, diatomaceous earths, barium sulphate, iron oxide, titanium dioxide, carbon black, talc, and wollastonite. Other fillers which might be used alone or in addition to those above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Additional fillers suitable for use in the composition include aluminum oxide, silicates from the group consisting of olivine group; garnet group; aluminosilicates; ring silicates; chain silicates; and sheet silicates. In certain embodiments, some fillers can be utilized to tune a thixotropic property of the composition.

In various embodiments, the composition further comprises an adhesion-imparting agent (e.g. an adhesion promotor). The adhesion-imparting agent can improve adhesion of the networked silicone formed from the composition, e.g. to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl) ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom. The organosilicon compound of the adhesion-imparting agent generally comprises a silicon-bonded alkenyl group or silicon-bonded hydrogen atom. Moreover, due to the ability to impart good adhesion with respect to various types of base materials, the organosilicon compound of the adhesion-imparting agent generally comprises at least one epoxy group-containing monovalent organic group in a molecule. These type of organosilicon compounds are exemplified by organosilane compounds, organosiloxane oligomers and alkyl silicates, as understood by those of skill in the art. Molecular structures of the organosiloxane oligomers and/or alkyl silicate are exemplified by a linear chain structure, partially branched linear chain structure, branched chain structure, ring-shaped structure, and net-shaped structure, where the linear chain structure, branched chain structure, and net-shaped structure are typical. Specific organosilicon compounds for use in or as the adhesion-imparting agent are exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxy group and at least one silicon-bonded alkenyl group in the molecule; and methyl polysilicate, ethyl polysilicate, and epoxy group-containing ethyl polysilicate.

The one or more of the additives can be present as any suitable weight percent (wt. %) of the composition, such as 0.01 wt. % to 65 wt. %, 0.05 wt. % to 35 wt. %, 0.1 wt. % to 15 wt. %, 0.5 wt. % to 5 wt. %, or 0.1 wt. % or less, 1 wt. %, 2, 3, 4, 5, 6, 7, 8, 9, 10, 11, 12, 13, 14, or 15 wt. % or more of the composition. One of skill in the art can readily determine a suitable amount of a particular additive depending, for example, on the type of additive and the desired outcome.

In specific embodiments, the composition comprises a carrier vehicle. The carrier vehicle is not limited as is typically selected for based on the particular looped organosilicon compound (A), crosslinking compound (B), and catalyst (C) selected, such as in view of a desired crosslinking reaction thereof. For example, in some embodiments, the carrier vehicle comprises, alternatively may be, an oil (e.g. an organic oil and/or a silicone oil), a fluid, a solvent, etc., or a combination thereof.

In some embodiments, the carrier vehicle comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s, include DOWSIL;® 200 Fluids and DOWSIL® OS FLUIDS, which are commercially available from Dow Silicones Corporation of Midland, Mich., U.S.A.

In certain embodiments, the carrier vehicle comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the carrier vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof.

Other carrier vehicles may also be utilized in the composition. For example, in some embodiments, the carrier vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis (trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis (trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl) imide, lithium bis(trifluoromethanesulfonyl)imide, and the like, as well as derivatives, modifications, and combinations thereof.

In certain embodiments, the carrier vehicle comprises, alternative is, water. The water is not particularly limited. For example, purified water such as distilled water and ion exchanged water, saline, a phosphoric acid buffer aqueous solution, and the like, or combinations and/or modifications thereof, can be used.

The carrier vehicle may comprise a combination of different vehicles, which may be miscible or immiscible with one another. For example, the composition itself may be homogenous or heterogeneous. The composition may also be in the form of an emulsion, such as a water-in-oil emulsion, silicone-in-oil emulsion, oil-in-water emulsion, oil-in-silicone emulsion, etc.

Preparation Method: Preparing the Networked Silicone

A method of preparing the networked silicone (the "preparation method") is also provided. The preparation method comprises reacting the looped organosilicon compound (A) and the crosslinking compound (B), optionally in the presence of the catalyst (C), to give the networked silicone. Accordingly, as will be appreciated by those of skill in the art in view of the description herein, the preparation method may be carried out or otherwise performed with the composition described above.

In general, reacting the looped organosilicon compound (A) and the crosslinking compound (B) comprises combining the looped organosilicon compound (A) and the crosslinking compound (B), optionally in the presence of the catalyst (C). Said differently, there is generally no proactive step required for the reaction beyond combining the looped organosilicon compound (A) and the crosslinking compound (B), and optionally the catalyst (C). As will be appreciated by those of skill in the art, the reaction of the looped organosilicon compound (A) and the crosslinking compound (B) may be generally defined or otherwise characterized depending on the particular nature of the cross-linking reaction (i.e., based on the particular cross-linkable groups $R^2$ and reactive functional groups $R^3$ utilized). As such, the particular conditions of the reaction may be selected by those of skill in the art based on the crosslinking reaction in particular.

Looped Organosilicon Compound (A)

The looped organosilicon compound (A) utilized in the preparation method is as described above with respect to the composition. As such, the description of the looped organosilicon compound (A) above, e.g. the description relating to the general formula (I), equally applies to the looped organosilicon compound (A) utilized in the preparation method.

The looped organosilicon compound (A) may be utilized in any amount, which will be selected by one of skill in the art, e.g. dependent upon the particular components selected for reacting, the reaction parameters employed, the scale of the reaction (e.g. total amounts of component (A) to be reacted and/or networked silicone to be prepared), etc.

The looped organosilicon compound (A) may be utilized in any form, such as neat (i.e., absent solvents, carrier vehicles, diluents, etc.), or disposed in a carrier vehicle, such as a solvent or dispersant. The carrier vehicle, if present, may comprise, alternatively may be, any of those described above. For example, the carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform, etc.; ethers such as diethyl ether, tetrahydrofuran, etc.; etc.), a silicone fluid, or combinations thereof. When utilized, the carrier vehicle will be selected based on the particular components of the reaction, such as the particular looped organosilicon compound (A), crosslinking compound (B), and catalyst (C) selected, such as in view of a desired crosslinking reaction thereof. More specifically, in some embodiments, the carrier vehicle is selected based on the nature and type of cross-linkable group $R^2$ and reactive functional groups $R^3$ and/or the type of crosslinking reaction of the same. For example, in certain embodiments, the method is carried out in the presence of a carrier vehicle or solvent comprising a polar component, such as an ether, acetonitrile, dimethylformamide, dimethylsulfoxide, and the like, or combinations thereof. In some embodiments, the carrier vehicle may comprise a halogenated hydrocarbon, such as those described above.

It will be appreciated that the looped organosilicon compound (A) may be combined with the carrier vehicle, if utilized, prior to, during, or after being combined with any one or more other components of the reaction. In certain embodiments, the looped organosilicon compound (A) may be utilized as a carrier vehicle for the reaction, e.g. when the looped organosilicon compound (A) itself is fluid/liquid under the reaction conditions employed.

In certain embodiments, the looped organosilicon compound (A) is free from, alternatively substantially free from carrier vehicles. In some such embodiments, the looped organosilicon compound (A) is free from, alternatively substantially free from, water and carrier vehicles/volatiles reactive with the looped organosilicon compound (A) and/or any one or more other components of the reaction. In some embodiments, the method is carried out in the absence of carrier vehicles/volatiles that are reactive with the looped organosilicon compound (A) and/or any one or more other components of the reaction. For example, in certain embodiments, the method may comprise stripping a mixture of the looped organosilicon compound (A) of volatiles and/or solvents prior to combining the same with any one or more other components of the reaction. Techniques for stripping the looped organosilicon compound (A) are known in the art, and may include heating, drying, applying reduced pressure/vacuum, azeotroping with solvents, utilizing molecular sieves, etc., and combinations thereof.

The looped organosilicon compound (A) may be prepared as part of the preparation method, or otherwise obtained (i.e., as a prepared compound). In certain embodiments, the preparation method includes preparing the looped organosilicon compound (A) prior to reacting the same with the crosslinking compound (B).

Preparing the Looped Organosilicon Compound (A)

In some embodiments, preparing the looped organosilicon compound (A) comprises reacting (A1) an initial organosilicon compound and (A2) a looping compound, optionally in the presence of (A3) a catalyst, to give the looped organosilicon compound (A).

Initial Organosilicon Compound (A1)

In general, the initial organosilicon compound (A1) is an organosilicon compound comprising an organosiloxane-containing backbone having at least three cross-linkable groups. More specifically, the initial organosilicon compound (A1) has the general formula (V):

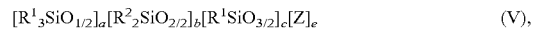

$$[R^1{}_3SiO_{1/2}]_a[R^2{}_2SiO_{2/2}]_b[R^1SiO_{3/2}]_c[Z]_e \qquad (V),$$

where Z, $R^1$, $R^2$, and subscripts a, b, c, and e are each as defined above with respect to the looped organosilicon compound (A), with the proviso that at least three $R^2$ are the cross-linkable group. Accordingly, the initial organosilicon compound (A1) is an organosiloxane polymer or an organosiloxane-organic copolymer.

As will be appreciated by those of skill in the art in view of the description herein, the initial organosilicon compound (A1) forms the portions of the looped organosilicon compound (A) generally indicated by subscripts a, b, c, and e in general formula (I) (i.e., the organic portion and the non-looped silicone portion). Additionally, some of the D siloxane units of the initial organosilicon compound (A1) (i.e., some of those indicated by subscript b in general formula (V)), form the siloxane backbone of the looped moiety X (i.e., the sub formula [—Si(R$^1$)O[Y]Si(R$^1$)O—] of general formula (II)) of the looped organosilicon compound (A)., where the linking groups D of the looped moiety X are formed by reaction of the cross-linkable group $R^2$ and the looping compound (A2).

In certain embodiments, the initial organosilicon compound (A1) has the general formula (VI):

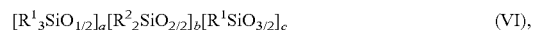

$$[R^1{}_3SiO_{1/2}]_a[R^2{}_2SiO_{2/2}]_b[R^1SiO_{3/2}]_c \qquad (VI),$$

where each variable is as described herein, with the proviso that at least three $R^2$ are the cross-linkable group. In these embodiments, the initial organosilicon compound (A1) itself is a polyorganosiloxane compound having the general formula (VI). However, in some of these embodiments, subscript e is 0 with the proviso that at least one $R^1$ is a divalent linking group bonded to an organic moiety Z, or where one $R^2$ is such an $R^1$, such that backbone of the looped organosilicon compound (A) still comprises an organic portion having one or more organic moieties Z (i.e., where such organic moieties Z are pendant rather than integral with the backbone itself). Regardless, in either of such embodiments, subscript e is 0 such that the backbone of the initial organosilicon compound (A1) does not comprise any of the organic moieties Z.

In some such embodiments, the initial organosilicon compound (A1) has the general formula (VI), where each $R^2$ is independently $R^1$ or a hydrosilylatable group selected from an alkenyl group and H, with the proviso that at least three of $R^2$ are the hydrosilylatable group. In these or other embodiments, the initial organosilicon compound (A1) has the general formula (VI), where: each $R^1$ is methyl; subscript b is from 10 to 1,000,000, alternatively of from 20 to 5000; and each hydrosilylatable group is vinyl or allyl.

Looping Compound (A2)

In general, the looping compound (A2) is an organosiloxane polymer, an organosiloxane-organic copolymer, or an organic polymer comprising two functional groups that are reactive with the cross-linkable group $R^2$ of the initial organosilicon compound (A1). More specifically, the looping compound (A2) typically has the general formula $R^4$—$[Z]_f[Y]g$-$R^4$, where each $R^4$ is an independently selected functional group reactive with the cross-linkable group $R^2$ of the initial organosilicon compound (A1), and Z, Y, and subscripts f and g are as defined above.

It is to be appreciated that the looping compound (A2) may be the same as or different from the crosslinking compound (B) described above, which will be understood in view of the scope of each compound as described herein. For example, the reactive functional groups $R^3$ may be the same as the reactive functional groups $R^4$, as both groups capable of reacting with the cross-linkable group(s) $R^2$. Likewise, the siloxane segment(s) and/or organic segment(s) of the crosslinking compound (B) may be the same as or different from the siloxane moiety Y and organic moiety Z of the looping compound (A2), respectively.

As will be appreciated by those of skill in the art in view of the description herein, the looping compound (A2) forms the portion of the looped organosilicon compound (A) corresponding to the sub formula $[-[Z]_f[Y]g$-$]$ of looped moiety X of general formula (II), where the linking groups D of the looped moiety X are formed via reaction of two of the cross-linkable groups $R^2$ and with the two reactive functional groups $R^4$ of the looping compound (A2).

In certain embodiments, the looping compound (A2) has the general formula $R^4$—Y—$R^4$, where Y is a divalent organosiloxane linking group, each $R^4$ is an independently selected functional group reactive with the cross-linkable group $R^2$ of the initial organosilicon compound (A1), and Z, Y, and subscripts f and g are as defined above. In some such embodiments, Y is a polyorganosiloxane having the general formula $[R^1_jSiO_{(4-i)/2}]_{h''}$, where $R^1$, subscript j, and h'' are as defined above. In some such embodiments, each $R^1$ is methyl, subscript i is 2 in each moiety indicated by subscript h'', and/or subscript h'' is from 50 to 1000. In these or other embodiments, each of the reactive functional groups $R^4$ is a hydrosilylatable group selected from an alkenyl group and H. In specific embodiments, each $R^4$ is a silicon-bonded hydrogen atom.

Catalyst (A3)

As introduced above, preparing the looped organosilicon compound (A) may comprise reacting the initial organosilicon compound (A1) and the looping compound (A2) in the presence of the catalyst (A3). The use of the catalyst (A3), as well as the particular type or specific compound(s) selected for use in or as the catalyst (A3), will be readily selected by those of skill in the art based on the particular initial organosilicon compound (A1) and looping compound (A2) selected. More specifically, the catalyst (A3) is selected to catalyze formation of looped moieties X of the looped organosilicon compound (A) via reaction of both reactive functional groups $R^4$ of the looping compound (A2) cross-linkable groups $R^2$ of the initial organosilicon compound (A1).

The catalyst (A3) is not particularly limited, and may comprise or be any compound suitable for facilitating the reaction of the initial organosilicon compound (A1) and the looping compound (A2) (e.g. via reaction of/including cross-linkable group $R^2$ and reactive functional groups $R^4$), as will be understood by one of skill in the art in view of the description herein. For example, in certain embodiments, the catalyst (A3) is selected from those facilitating reactions including hydrosilylation, condensation, displacement, acid-base, ring-opening, nucleophilic substitution, radical coupling, and the like, as well as combinations of such reactions. Accordingly, the catalyst (A3) may be selected form any of the catalysts described herein with respect to the catalyst (C).

Looping Reaction Conditions

Typically, components (A1) and (A2), and optionally (A3), are reacted in a vessel or reactor to prepare the looped organosilicon compound (A). When the reaction is carried out at an elevated or reduced temperature as described below, the vessel or reactor may be heated or cooled in any suitable manner, e.g. via a jacket, mantle, exchanger, bath, coils, etc.

Components (A1) and (A2), and optionally (A3), may be fed together or separately to the vessel, or may be disposed in the vessel in any order of addition, and in any combination. For example, in certain embodiments, components (A2) and (A3) are added to a vessel containing component (A1). In such embodiments, components (A2) and (A3) may be first combined prior to the addition, or may be added to the vessel sequentially (e.g. (A3) then (A2)). In other embodiments, component (A3) is added to a vessel containing components (A1) and (A2), either as a premade catalyst or as individual components to form the catalyst (A3) in situ. In general, reference to the "reaction mixture" herein refers generally to a mixture comprising components (A1) and (A2), and optionally (A3) if utilized, (e.g. as obtained by combining such components, as described above).

The method may further comprise agitating the reaction mixture. The agitating may enhance mixing and contacting together components (A1), (A2), and optionally (A3), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., crosslinking), of the initial organosilicon compound (A1) with the looping compound (A2) to form the looped organosilicon compound (A). Other conditions may be result-effective conditions for enhancing reaction yield or minimizing amount of a particular reaction by-product included within the reaction product along with the looped organosilicon compound (A).

In general embodiments, the reaction of components (A1) and (A2) is carried out in the presence of a carrier vehicle or solvent, such as one or more of those described above. For example, portions of carrier vehicle or solvent may be added to or otherwise combined with the initial organosilicon compound (A1), the looping compound (A2), and/or the catalyst (A3) (when utilized) discretely, collectively with mixtures of components (A1), (A2) and/or (A3), or with the reaction mixture as a whole. The total amount of carrier vehicle/solvent present in the reaction mixture will be selected by one of skill in the art, e.g. based on the particular component (A1), (A2), and/or (A3) selected, the reaction parameters employed, etc.).

Typically, the carrier vehicle will be utilized in an amount sufficient to maximize intramolecular reactions of the looping compound (A2) and the initial organosilicon compound (A1), while minimizing intermolecular reactions (e.g. crosslinking reactions) therebetween. For example, in certain embodiments, the carrier vehicle is utilized in an amount of from 5 to 99 wt. %, such as from 5 to 95, alternatively from 10 to 95, alternatively from 50 to 90 wt. %, based on the total weight of the reaction mixture (i.e., the combined weight of components (A), (B), (C), the carrier vehicle, and any additional components/additives utilized).

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20° C. In some embodiments, the reaction is carried out at a temperature of about 0° C. (e.g. by use of an ice bath, or a circulator or chiller using ice and/or a set point of 0° C.). In some embodiments, the reaction is carried out at room temperature (i.e., from 20 to 25° C.).

In some embodiments, the reaction is carried out at the elevated temperature. The elevated temperature will be selected and controlled depending on the particular initial organosilicon compound (A1) selected, the particular looping compound (A2) selected, the reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 300° C., such as from 30 to 280, alternatively from 40 to 260, alternatively from 40 to 250, alternatively from 50 to 250, alternatively from 50 to 240, alternatively from 60 to 240, alternatively from 60 to 230, alternatively from 70 to 225, alternatively from 70 to 210, alternatively from 70 to 200° C.

In certain embodiments, the reaction is carried out at reduced pressure. The reduced pressure will be selected and controlled depending on the particular looping compound (A2) selected, the particular catalyst (A3) selected, etc. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization, degradation, and/or decomposition byproducts). Likewise, it is also to be appreciated that reaction parameters may be modified during the reaction of components (A1) and (A2). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A1) and (A2) to prepare the looped organosilicon compound (A) is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 96, alternatively from 2 to 72, alternatively from 2 to 48, alternatively from 3 to 36, alternatively from 4 to 24, alternatively of 6, 12, 18, 24, 36, or 48 hours, as will be readily determined by one of skill in the art (e.g. by monitoring conversion of the initial organosilicon compound (A1), production of the looped organosilicon compound (A), etc., such as via chromatographic and/or spectroscopic methods). In certain embodiments, the time during which the reaction is carried out is from greater than 0 to 48 hours, alternatively from 1 to 36 hours, alternatively from 1 to 24 hours, alternatively from 1 to 12 hours, alternatively from 2 to 12 hours, alternatively from 2 to 8 hours, after components (A1) and (A2) are combined, optionally in the presence of component (A3).

Reaction Product and Purification/Isolation

Generally, the reaction of components (A1) and (A2) prepares a reaction product comprising the looped organosilicon compound (A). In particular, over the course of the reaction, the reaction mixture comprising components (A1) and (A2) comprises increasing amounts of the looped organosilicon compound (A) and decreasing amounts of components (A1) and (A2). Once the reaction is complete (e.g. one of components (A1) and (A2) is consumed, no additional looped organosilicon compound (A) is being prepared, etc.), the reaction mixture may be referred to as a reaction product comprising the looped organosilicon compound (A). In this fashion, the reaction product typically includes any remaining amounts of components (A1) and (A2), and optionally (A3), as well as degradation and/or reaction products thereof (e.g. byproducts and/or other materials which were not previously removed via any distillation, stripping, etc.). If the reaction is carried out in any carrier vehicle or solvent, the reaction product may also include such carrier vehicle or solvent. In certain such embodiments, the carrier vehicle or solvent can be removed by distillation or stripping, such that the reaction product is substantially free from, alternatively free from, the carrier vehicle or solvent.

Crosslinking Compound (B)

The crosslinking compound (B) utilized in the preparation method is as described above with respect to the same compound of the composition. As such, the description of the crosslinking compound (B) above, e.g. that relating to general formula $R^3$-L-$R^3$, equally applies to the crosslinking compound (B) utilized in the preparation method.

The crosslinking compound (B) may be utilized in any amount, which will be selected by one of skill in the art, e.g. dependent upon the particular components selected for reacting, the reaction parameters employed, the scale of the reaction (e.g. total amounts of component (B) to be reacted and/or networked silicone to be prepared), etc.

The crosslinking compound (B) may be utilized in any form, such as neat (i.e., absent solvents, carrier vehicles, diluents, etc.), or disposed in a carrier vehicle, such as a solvent or dispersant. The carrier vehicle, if present, may comprise, alternatively may be, any of those described above. For example, the carrier vehicle, if present, may comprise an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform, etc.; ethers such as diethyl ether, tetrahydrofuran, etc.; etc.), a silicone fluid, or combinations thereof. When utilized, the carrier vehicle will be selected based on the particular components of the reaction, such as the particular looped organosilicon compound (A), crosslinking compound (B), and catalyst (C) selected, such as in view of a desired crosslinking reaction thereof. More specifically, in some embodiments, the carrier vehicle is selected based on the nature and type of cross-linkable group $R^2$ and reactive functional groups $R^3$ and/or the type of crosslinking reaction of the same. For example, in certain embodiments, the method is carried out in the presence of a carrier vehicle or solvent comprising a polar component, such as an ether, acetonitrile, dimethylformamide, dimethylsulfoxide, and the like, or combinations thereof. In some embodiments, the carrier vehicle may comprise a halogenated hydrocarbon, such as those described above.

It will be appreciated that the crosslinking compound (B) may be combined with the carrier vehicle, if utilized, prior to, during, or after being combined with any one or more other components of the reaction. In certain embodiments, the crosslinking compound B) may be utilized as a carrier vehicle for the reaction, e.g. when the crosslinking compound (B) itself is fluid/liquid under the reaction conditions employed.

In certain embodiments, the crosslinking compound (B) is free from, alternatively substantially free from carrier vehicles. In some such embodiments, the crosslinking compound (B) is free from, alternatively substantially free from, water and carrier vehicles/volatiles reactive with the crosslinking compound (B) and/or any one or more other components of the reaction. In some embodiments, the method is carried out in the absence of carrier vehicles/volatiles that are reactive with the crosslinking compound (B) and/or any one or more other components of the reaction. For example, in certain embodiments, the method may comprise stripping a mixture of the crosslinking compound (B) of volatiles and/or solvents prior to combining the same with any one or more other components of the reaction. Techniques for stripping the crosslinking compound (B) are known in the art, and may include heating, drying, applying reduced pressure/vacuum, azeotroping with solvents, utilizing molecular sieves, etc., and combinations thereof.

The crosslinking compound (B) may be prepared as part of the preparation method, or otherwise obtained (i.e., as a prepared compound). Methods of preparing compounds suitable for use in, or as, the crosslinking compound (B) are known in the art, and some of such compounds are commercially available from various suppliers. Additionally, preparing the crosslinking compound (B), when part of the preparation method, may be performed prior to the reaction of components (A) and (B), or in situ (i.e., during the reaction of components (A) and (B), such that component (B) is consumed upon formation, e.g. via combining components of the crosslinking compound (B) with component (A) and, optionally, the catalyst (C)).

Catalyst (C)

The catalyst (C) utilized in the preparation method is as described above with respect to the same component of the composition. As such, the description of the catalyst (C) above equally applies to the catalyst (C) utilized in the preparation method.

The catalyst (C) may be utilized in any form, such as neat (i.e., absent solvents, carrier vehicles, diluents, etc.), or disposed in a carrier vehicle, such as a solvent or dispersant (e.g. such as any of those listed above).

In some embodiments, the catalyst (C) is utilized in a form absent water and/or carrier vehicles/volatiles reactive with the looped organosilicon compound (A), the crosslinking compound (B), and/or the catalyst (C) itself (i.e., at least until combined with components (A) and (B)). For example, in certain embodiments, the method may comprise stripping the catalyst (C) of volatiles and/or solvents (e.g. water, organic solvents, etc.). Techniques for stripping the catalyst (C) are known in the art, and may include heating, drying, applying reduced pressure/vacuum, azeotroping with solvents, utilizing molecular sieves, etc., and combinations thereof.

The catalyst (C) may be utilized in any amount, which will be selected by one of skill in the art, e.g. dependent upon the particular catalyst (C) selected (e.g. the concentration/amount of active components thereof, the type of catalyst being utilized, the type of crosslinking reaction being performed, etc.), the reaction parameters employed, the scale of the reaction (e.g. total amounts of components (A) and (B), relative amount of cross-linkable group $R^2$ and reactive functional groups $R^3$, etc.), etc. The molar ratio of the catalyst (C) to components (A) and/or (B) utilized in the reaction may influence the rate and/or amount of crosslinking to prepare the networked silicone. Thus, the amount of the catalyst (C) as compared to components (A) and/or (B), as well as the molar ratios therebetween, may vary. Typically, these relative amounts and the molar ratio are selected to maximize the reaction of components (A) and (B) while minimizing the loading of the catalyst (C) (e.g. for increased economic efficiency of the reaction, increased ease of purification of the reaction product formed, etc.).

In certain embodiments, the catalyst (C) is utilized in the reaction in an amount of from 0.000001 to 50 wt. %, based on the total amount of component (A) utilized (i.e., wt./wt.). For example, the catalyst (C) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (A) utilized. Likewise, or alternatively, the catalyst (C) may be utilized in the reaction in an amount of from 0.000001 to 50 wt. %, based on the total amount of component (B) utilized (i.e., wt./wt.). For example, the catalyst (B) may be used in an amount of from 0.000001 to 40 wt. %, such as from 0.000001 to 20, alternatively of from 0.000001 to 10, alternatively of from 0.000002 to 5, alternatively of from 0.000002 to 2, alternatively of from 0.000002 to 0.5, alternatively of from 0.00001 to 0.5, alternatively of from 0.0001 to 0.5, alternatively of from 0.001 to 0.5, alternatively of from 0.01 to 0.5 wt. %, based on the total amount of component (B) utilized. It will be appreciated that ratios outside of these ranges may be utilized as well.

In some embodiments (e.g. when the type of crosslinking reaction dictates a stoichiometric loading), the amount of the catalyst (C) utilized may be selected and/or determined on a molar ratio based on one or more components of the reaction, as will be understood by those of skill in the art. In such embodiments, the catalyst (C) may be utilized in the reaction in an amount of from 0.001 to 50 mol %, based on the total amount of component (A) utilized. For example, the catalyst (C) may be used in an amount of from 0.005 to 40, alternatively of from 0.005 to 30, alternatively of from 0.005 to 20, alternatively of from 0.01 to 20 mol %, based on the total amount of component (A) utilized. Likewise, or alternatively, the catalyst (C) may be used in an amount of from 0.005 to 40, alternatively of from 0.005 to 30, alternatively of from 0.005 to 20, alternatively of from 0.01 to 20 mol %, based on the total amount of the crosslinking compound (B) utilized. However, it will also be appreciated that ratios outside of these ranges may be utilized.

Methods of preparing compounds suitable for use in, or as, the catalyst (C) are well known in the art, and many of the compounds listed herein are commercially available from various suppliers. As such, the catalyst (C) may be prepared as part of the method, or otherwise obtained (i.e., as a prepared compound). Additionally, preparing the catalyst (C) may be performed prior to the reaction of components (A) and (B), or in situ (i.e., during the reaction of components (A) and (B), e.g. via combining components of the catalyst (C) with components (A) and/or (B)).

Component Amounts

The relative amounts of the looped organosilicon compound (A) and the crosslinking compound (B) utilized may vary, e.g. based upon the particular looped organosilicon compound (A) selected, the particular crosslinking compound (B) selected, the reaction parameters employed, e.g. whether the catalyst (C) is utilized, etc. Typically, an excess (e.g. molar and/or stoichiometric) of one of components (A) and (B) is utilized to fully crosslink the looped organosilicon compound (A) and/or fully consume the crosslinking compound (B), e.g. to simplify purification of the reaction product formed therefrom. For example, in certain embodiments, the crosslinking compound (B) is utilized in relative excess of the looped organosilicon compound (A)) to maximize crosslinking of the looped organosilicon compound (A) to prepare the networked silicone therefrom. It will be appreciated that the looped organosilicon compound (A) may instead be used in excess of the crosslinking compound (B) (e.g. when maximum consumption of the crosslinking compound (B) is desired.

As understood by those of skill in the art, the crosslinking of the looped organosilicon compound (A) with the crosslinking compound (B) occurs at a theoretical maximum based on the number of cross-linkable groups $R^2$ present within the looped organosilicon compound (A). In particular, with reference to general formula (I) of the looped organosilicon compound (A) above, each cross-linkable group designated by Si—$R^2$ can be reacted with one of the reactive functional groups $R^3$ of the crosslinking compound (B), of which there are two, such that one molar equivalent of the crosslinking compound (B) is needed for every two cross-linkable groups of the looped organosilicon compound (A) to achieve a theoretically complete (i.e., maximum) crosslinking reaction. Likewise, the theoretical maximum stoichiometric ratio of the reaction of the looped organosilicon compound (A) with the crosslinking compound (B) is 1:1 [$R^2$]:[$R^3$], where [$R^2$] represents the number of cross-linkable groups of the looped organosilicon compound (A) and [$R^3$] represents the number of reactive functional groups $R^3$ of the crosslinking compound (B), which is generally fixed at 2. As such, the looped organosilicon compound (A) and the crosslinking compound (B) are typically reacted in a stoichiometric ratio of from 10:1 to 1:10, alternatively from 8:1 to 1:8, alternatively from 6:1 to 1:6, alternatively from 4:1 to 1:4, alternatively from 2:1 to 1:2, alternatively 1:1 [$R^2$]:[$R^3$], where [$R^2$] and [$R^3$] are as defined above. In these or other embodiments, the looped organosilicon compound (A) and the crosslinking compound (B) are reacted in a molar ratio of from 10:1 to 1:10, alternatively from 8:1 to 1:8, alternatively from 6:1 to 1:6, alternatively from 4:1 to 1:4, alternatively from 2:1 to 1:2, alternatively 1:1, (A):(B).

It will be appreciated, however, that ratios outside of the specific ranges above may also be utilized. For example, in certain embodiments, the crosslinking compound (B) is utilized in a gross excess (e.g. in an amount of ≥5, alternatively ≥10, alternatively ≥15, alternatively ≥20, times the stoichiometric amount of cross-linkable groups of the looped organosilicon compound (A)), such as when the crosslinking compound (B) is utilized as a carrier (i.e., a solvent, diluent, etc.) during the reaction. Regardless, one of skill in the art will readily select the particular amounts and ratios of the various components to prepare the networked silicones according to the embodiments described herein, including the theoretical maximum reactivity ratios described above, the presence of any carrier vehicle(s), the particular components utilized, etc.

As introduced above, each of the looped organosilicon compound (A), crosslinking compound (B), and catalyst (C) (when utilized) may be provided "as is", i.e., ready for the reaction to prepare the networked silicone. Alternatively, any one or more, or all, of components (A), (B), and (C) may be formed prior to or during the reaction. As such, in some embodiments, the method comprises preparing the looped organosilicon compound (A), the crosslinking compound (B), and/or the catalyst (C). In specific embodiments, the method comprises preparing the looped organosilicon compound (A).

Crosslinking Reaction Conditions

Typically, components (A) and (B), and optionally (C), are reacted in a vessel or reactor to prepare the networked silicone. When the reaction is carried out at an elevated or reduced temperature as described below, the vessel or reactor may be heated or cooled in any suitable manner, e.g. via a jacket, mantle, exchanger, bath, coils, etc.

Components (A) and (B), and optionally (C), may be fed together or separately to the vessel, or may be disposed in the vessel in any order of addition, and in any combination. For example, in certain embodiments, components (B) and (C) are added to a vessel containing component (A). In such embodiments, components (B) and (C) may be first combined prior to the addition, or may be added to the vessel sequentially (e.g. (C) then (B)). In other embodiments, component (C) is added to a vessel containing components (A) and (B), either as a premade catalyst or as individual components to form the catalyst (C) in situ. In general, reference to the "reaction mixture" herein refers generally to a mixture comprising components (A) and (B), and optionally (C) if utilized, (e.g. as obtained by combining such components, as described above).

The method may further comprise agitating the reaction mixture. The agitating may enhance mixing and contacting together components (A), (B), and optionally (C), when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., crosslinking), of the looped organosilicon compound (A) with the crosslinking compound (B) to form the networked silicone. Other conditions may be result-effective conditions for enhancing reaction yield or minimizing amount of a particular reaction by-product included within the reaction product along with the networked silicone.

In certain embodiments, the reaction of components (A) and (B) is carried out in the presence of a carrier vehicle or solvent, such as one or more of those described above. For example, portions of carrier vehicle or solvent may be added to or otherwise combined with the looped organosilicon compound (A), the crosslinking compound (B), and/or the catalyst (C) (when utilized) discretely, collectively with mixtures of components (A), (B) and/or (C), or with the reaction mixture as a whole. The total amount of carrier vehicle/solvent present in the reaction mixture will be selected by one of skill in the art, e.g. based on the particular component (A), (B), and/or (C) selected, the reaction parameters employed, etc.).

In certain embodiments, the reaction of components (A) and (B) is carried out in the absence of any carrier vehicle or solvent. For example, no carrier vehicle or solvent may be combined discretely with the looped organosilicon compound (A), the crosslinking compound (B), and/or the catalyst (C) (when utilized). In these or other embodiments, none of components (A), (B), and (C) are disposed in any carrier vehicle or solvent, such that no carrier vehicle or solvent is present in the reaction mixture during the crosslinking (i.e., the reaction mixture is free from, alternatively substantially free from, solvents).

The above notwithstanding, in certain embodiments, one or both of components (A) and (B) may be a carrier, e.g. when utilized as a fluid in an amount sufficient to carry, dissolve, or disperse any other component(s) of the reaction mixture. In specific embodiments, the crosslinking compound (B) is utilized as a carrier. Additionally, it will be appreciated that the crosslinking of the looped organosilicon compound (A) with the crosslinking compound (B) may result in the production small molecule byproducts such as water, alcohols, etc. (hereinafter the "byproducts"), which may act as a carrier in the reaction mixture. As such, the byproducts may be utilized as a carrier (i.e., once produced).

In certain embodiments, the byproducts are removed from the reaction mixture once produced. As understood in the art, some of the crosslinking reactions described above (e.g. condensations) are reversible reactions, such that removing the byproducts from the reaction mixture influences the reaction in terms of selectivity in favor, and/or overall yields, of the networked silicone (e.g. by selectively driving the equilibrium of the reaction toward that product). Removing the byproducts may include distillation, heating, applying reduced pressure/vacuum, azeotroping with solvents, utilizing molecular sieves, etc., and combinations thereof, even during the reaction.

In some embodiments, the reaction is carried out at the elevated temperature. The elevated temperature will be selected and controlled depending on the particular looped organosilicon compound (A) selected, the particular crosslinking compound (B) selected, the reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 300° C., such as from 30 to 280, alternatively from 40 to 260, alternatively from 40 to 250, alternatively from 50 to 250, alternatively from 50 to 240, alternatively from 50 to 230, alternatively from 50 to 225, alternatively from 50 to 200, alternatively from 50 to 190, alternatively from 50 to 180, alternatively from 50 to 170, alternatively from 50 to 160, alternatively from 50 to 150, alternatively from 60 to 150, alternatively from 70 to 150, alternatively from 80 to 150, alternatively from 90 to 150, alternatively from 90 to 140, alternatively from 90 to 130, alternatively from 100 to 130, alternatively from 110 to 130, alternatively from 110 to 120° C.

In certain embodiments, the reaction is carried out at a reduced temperature. The reduced temperature is typically less than 25° C. (ambient temperature), such as from −78° C. to less than ambient temperature, alternatively from −30 to less than ambient temperature, alternatively from −15 to less than ambient temperature, alternatively from −10 to less than ambient temperature, alternatively from −10 to 20, alternatively from −5 to 20° C. In some embodiments, the reaction is carried out at a temperature of about 0° C. (e.g. by use of an ice bath, or a circulator or chiller using ice and/or a set point of 0° C.). In some embodiments, the reaction is carried out at room temperature (i.e., from 20 to 25° C.).

In certain embodiments, the reaction is carried out at reduced pressure. The reduced pressure will be selected and controlled depending on the particular crosslinking compound (B) selected, the particular catalyst (C) selected, etc. Accordingly, the reduced pressure will be readily selected by one of skill in the art in view of the reaction conditions and parameters selected and the description herein. The reduced pressure is typically operated as a vacuum although any reduced pressure between vacuum and atmospheric pressure (i.e., 101.325 kPa) may be utilized. For example, the reduced pressure may be from greater than 0 to 30, alternatively from greater than 0 to 20, alternatively from greater than 0 to 15, alternatively from greater than 0 to 10, alternatively from greater than 0 to 8, alternatively from greater than 0 to 6, alternatively from greater than 0 to 5, alternatively from greater than 0 to 4, alternatively from greater than 0 to 3, alternatively from greater than 0 to 2, kPa (e.g. as measured by mmHg).

It is to be appreciated that the elevated temperature and/or reduced pressure may also differ from the ranges set forth above, especially when both elevated temperature and reduced pressure are utilized. For example, in certain embodiments, the reduced pressure is utilized in order to maintain reaction progression while utilizing a lower reaction temperature, which may lead to a decrease in the formation of undesirable byproducts (e.g. polymerization, degradation, and/or decomposition byproducts). Likewise, it is also to be appreciated that reaction parameters may be modified during the reaction of components (A) and (B). For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.)

The time during which the reaction of components (A) and (B) to prepare the networked silicone is carried out is a function of scale, reaction parameters and conditions, selection of particular components, etc. On a relatively large scale (e.g. greater than 1, alternatively 5, alternatively 10, alternatively 50, alternatively 100 kg), the reaction may be carried out for hours, such as from 2 to 240, alternatively from 2 to 120, alternatively from 2 to 96, alternatively from 2 to 72, alternatively from 2 to 48, alternatively from 3 to 36, alternatively from 4 to 24, alternatively of 6, 12, 18, 24, 36, or 48 hours, as will be readily determined by one of skill in the art (e.g. by monitoring conversion of the looped organosilicon compound (A), production of the networked silicone, etc., such as via chromatographic and/or spectroscopic methods). In certain embodiments, the time during which the reaction is carried out is from greater than 0 to 240 hours, alternatively from 1 to 120 hours, alternatively from 1 to 96 hours, alternatively from 1 to 72 hours, alternatively from 1 to 48 hours, alternatively from 1 to 36 hours, alternatively from 1 to 24 hours, alternatively from 1 to 12 hours, alternatively from 2 to 12 hours, alternatively from 2 to 8 hours, after components (A) and (B) are combined, optionally in the presence of component (C). In specific embodiments, the time during which the reaction is carried out is from greater than 0 to 10 hours, such as from 1 minute to 8 hours, alternatively from 5 minutes to 6 hours, alternatively from 10 minutes to 4 hours, alternatively from 10 minutes to 2 hours.

Reaction Product and Purification/Isolation

Generally, the reaction of components (A) and (B) prepares a reaction product comprising the networked silicone. In particular, over the course of the reaction, the reaction mixture comprising components (A) and (B) comprises increasing amounts of the networked silicone and decreasing amounts of components (A) and (B). Once the reaction is complete (e.g. one of components (A) and (B) is consumed, no additional networked silicone is being prepared, etc.), the reaction mixture may be referred to as a reaction product comprising the networked silicone. In this fashion, the reaction product typically includes any remaining amounts of components (A) and (B), and optionally (C), as well as degradation and/or reaction products thereof (e.g. byproducts and/or other materials which were not previously removed via any distillation, stripping, etc.). If the reaction is carried out in any carrier vehicle or solvent, the reaction product may also include such carrier vehicle or solvent.

In certain embodiments, the method further comprises isolating and/or purifying the networked silicone from the reaction product. As used herein, isolating the networked silicone is typically defined as increasing the relative concentration of the networked silicone as compared to other compounds in combination therewith (e.g. in the reaction product or a purified version thereof). As such, as is understood in the art, isolating/purifying may comprise removing the other compounds from such a combination (i.e., decreasing the amount of impurities combined with the networked silicone, e.g. in the reaction product) and/or removing the networked silicone itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any another technique to isolate the networked silicone.

It is to be appreciated that isolating may include, and thus may be referred to as, purifying the networked silicone. However, purifying the networked silicone may comprise alternative and/or additional techniques as compared to those utilized in isolating the networked silicone. Regardless of the particular technique(s) selected, isolation and/or purification of networked silicone may be performed in sequence (i.e., in line) with the reaction itself, and thus may be automated. In other instances, purification may be a stand-alone procedure to which the reaction product comprising the networked silicone is subjected.

Networked Silicone

As will be understood in view of the description above, the networked silicone is generally prepared with the compositions and/or as a product of the preparation method. Accordingly, the particular networked silicone prepared is a function of the particular looped organosilicon compound (A) and the particular crosslinking compound (B) utilized.

In general, and as introduced above, the networked silicone comprises crosslinked strands of looped organosilicon compounds, as illustrated by the reaction product of reaction (II) in FIG. 1. More specifically, with regard to FIG. 1, the networked silicone is prepared by crosslinking a looped organosilicon compound (A) (e.g. prepared by reaction of the initial organosilicon compound (A1) and looping compound (A2), as shown in reaction (1)) with a crosslinking compound (B). The crosslinking of the looped organosilicon compound (A) results in a silicone network having increased chain entanglement, or properties akin thereto, from interactions between looped moieties and crosslinking groups interconnecting organosilicon strands. Depending on the parameters of the preparation method selected, the networked silicone may be formed with a proportion of the crosslinking groups cutting between the looped moieties. In certain embodiments, the networked silicone may be formed with a proportion of the crosslinking groups threading through the looped moieties. The networked silicone thus formed comprises increased toughness.

Cured Product, Composite Article, and Related Methods

A cured product is also provided. The cured product is formed from the composition. More specifically, the cured product is formed by curing the composition, e.g. via the crosslinking reaction described above. In certain embodiments, the cured product is formed by preparing a curable composition comprising the networked silicone and curing the curable composition, e.g. via reacting the networked silicone with a component of the curable composition, thereby forming the cured product.

With regard to the curable composition, the method(s) of the curing is not particularly limited, and may include any method and/or technique of curing known by those of skill in the art compatible with the networked silicone and related compositions described herein. Examples of curing methods and/or technique include photocuring, moisture curing, crosslinking, etc.

A composite article comprising the cured product is also provided. More specifically, the composite article comprises a substrate and the cured product disposed on the substrate. The composite article is formed by disposing a networked silicone composition (i.e., the composition or the curable composition described above) on the substrate, and curing the networked silicone composition to give the cured product on the substrate, thereby preparing the composite article.

The substrate is exemplified by, for example, a component of a functional device. The particular type and nature of the functional device is not particular limited, and may be any kind of optical, electrical, and/or electronic device, such that the component may comprise, or be utilized in devices containing, a waveguide, electrical circuit, electrode, etc. Particular examples of functional devices include: optical devices; photoelectric devices; photo mechanic devices; photomagnetic devices; electrical and/or electronic devices; electro-optical devices; mechanical devices; electromechanical devices including a micro-electromechanical system; magnetic devices; photo-electro-magnetic devices; mechanomagnetic devices; thermal devices; thermo-mechanical devices; thermo-optical devices; thermo-electric and/or thermo-electronic devices; thermo-magnetic devices; and the like, as well as derivatives, modifications, and combinations thereof. As will be appreciated by those of skill in the art, the composite article itself may also be a component of a functional device, such as any of those described above.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

EXAMPLES

The following examples, illustrating embodiments of this disclosure, are intended to illustrate and not to limit the invention. The brief summary below provides information and terminology used in the procedures and examples that follow.

Equipment and Characterization Parameters

The following equipment and characterization procedures/parameters are used to evaluate various physical properties of the compounds prepared in the examples below.

Equipment

Parallel-Plate Geometry is a TA instruments Discovery HR-2 with a 8 mm Smart Swap Peltier Plate geometry, part number 511080.906.

Vacuum Oven is a National Appliance Company vacuum oven, model 5831, connected to a Boc Edwards dual vacuum pump system cart, part number NGU515000.

Container is a metal rectangular container 95×62×20 mm with a hinged lid.

Release Film is 0.005" polyethylene terephthalate release film purchased from McMaster-Carr 8567K95.

Rheological Measurements 8 mm round samples are prepared using a die cutter from an elastomer sheet with a typical thickness of 1.0 mm. Amplitude strain sweep experiments are conducted on Parallel-Plate Geometry. Amplitude strain sweep experiments are performed at a 1.0 N load, 25° C., 10 rad/s frequency, from 0.0001 to 10 strain percent to generate data. This data is used to determine a linear viscoelastic regime and yield stress. Frequency sweep experiments are conducted on Parallel-Plate Geometry. Frequency sweep experiments are performed from 0.1 rad/s to 100 rad/s at 1% strain, which have previously been confirmed to be in the linear viscoelastic regime. A shear modulus G' is determined based on G' values at 1 rad/s.

Tensile Testing

Elastomer strips are cut from an elastomer sheet with a typical thickness of 0.5 mm with a new razor blade using one motion per side. The elastomer strips are cut with a typical length of 20 mm and a width of 3 mm, and then the elastomer strips are individually glued onto paper frames with 0.2 mL of silicone sealant (Loctite clear silicone waterproof sealant) applied in a layer between the paper frames and the elastomer strips, and surrounding the upper 4 mm of the elastomer strips. The silicone sealant is cured for at least 24 hours. Paper frames for tensile testing are laser cut from 0.012" thick ivory cardstock into 0.39"×1.91" rectangles with a 0.25"×0.48" rectangular cutout. Tensile experiments are run at 1.0 mm/minute with a 10 N load cell on a testing system (Instron 8848 Microtester) unless otherwise specified.

Gel Fraction

A gel fraction is determined by measuring out a sample of a 10.0 mg cubic elastomer. The sample is placed into a vial with 1.0 mL of a dichloromethane, and then tightly capped. After 2 hours from the initial swelling, the dichloromethane is removed from the sample and replaced with an equal volume of dichloromethane. After allowing the sample to extract overnight, the final fraction of dichloromethane is removed. The sample is then transferred into Vacuum Oven connected to Vacuum Pump System at room temperature, and a pressure of 66 mbar overnight, and then massed again. The gel fraction is defined as the final mass over the initial mass. At minimum, three samples are taken for each elastomer measured.

Gel Permeation Chromatography

Gel permeation chromatography (GPC) was performed on a Tosoh system equipped with a First Column (TSK guard column SuperHZ, 4.6 mm ID×3.5 cm, 4 μm), a Second Column (TSKgel SuperHZ 4000, 6.0 mm ID×15 cm, 3 μm), a Third Column (TSKgel SuperHZ 3000, 6.0 mm ID×15 cm, 3 μm), and a Final Column (TSKgel SuperHZ 2500, 6.0 mm ID×15 cm, 3 μm) in series using 0.6 mL/min chloroform at 25° C. as eluent.

GPC with absolute molecular weight determination was performed on a High Performance Liquid Chromatography System (HPLC) (Agilent 1260 instrument) with two Chromatography Columns (Shodex KD-806 M columns 161) in series, a chloroform mobile phase run at 25° C., a Differential Refractive Index Detector (Wyatt Optilab T-rEX detector), and a Light Scattering Detector (Wyatt Heleos II detector).

Gel Swelling

Gel swelling data is obtained by measuring out a sample of a 10.0 mg cubic elastomer. The sample is placed into a vial with 1.0 mL of a toluene and tightly capped. The sample is equilibrated for a minimum of 24 hours. After equilibration, the toluene is carefully removed, and the surface of the sample is lightly dried with a lab wipe. The sample, now swollen, is massed, and then transferred into Vacuum Oven held at room temperature, and a pressure of 66 mbar. Vacuum Oven is connected to Vacuum Pump System and the sample remains there for 48 hours, and is then massed again. At minimum, three samples are taken for each elastomer measured. The density of the toluene ($\rho_{toluene}$) is taken as 0.86 g/mL, the molar volume of the toluene ($V_{toluene}$) as 106.69 mL/mol, the polymer solvent interaction parameter, X, as 0.48 and the density of PDMS as 0.98 g/mL. The equilibrium swelling ratio Q is calculates using Equation D:

$$Q = \frac{V_{toluene} + V_{PDMS}}{V_{PDMS}}, \quad \text{(Equation 1)}$$

where $V_{toluene}$ is the volume of toluene in the sample and $V_{PDMS}$ is the volume of the PDMS in the sample. The equilibrium volume fraction of polymer $V_{PDMS}$ is taken as the inverse of Q, as shown in Equation 2:

$$Q = \frac{1}{V_{PDMS}}. \quad \text{(Equation 2)}$$

The Flory-Rehner equation is then used to determine the average molecular weight between crosslinks ($M_C$) and the cross linking density, as shown in Equation 3:

$$-[\ln(1 - v_{PDMS}) + v_{PDMS} + Xv_{PDMS}^2] = \frac{\rho_{toluene}}{M_c} V_{toluene} v_{PDMS}^{\frac{1}{3}}. \quad \text{(Equation 3)}$$

Components/Compounds

The various components utilized in the Examples are set forth in Table 1 below.

TABLE 1

| Compounds Utilized in Examples 1-29 and Comparative Examples 1-19 | |
|---|---|
| Component | Description |
| Initial Organosilicon Compound (A1-1) | Trimethylsiloxy-terminated dimethylsiloxane copolymer, with 7.0-8.0% vinylmethylsiloxane; viscosity (25° C.) = 800-1200 cSt; MW = 28,00 0g/mol |
| Looping Compound (A2-1) | Hydride terminated polydimethyl siloxane; viscosity (25° C.) = 100 cSt; MW = 4,000-5,000 g/mol |
| Looping Compound (A2-2) | Hydride terminated polydimethyl siloxane; viscosity (25° C.) = 500 cSt; MW = 17,200 g/mol |
| Looping Compound (A2-3) | Hydride terminated polydimethyl siloxane; viscosity (25° C.) = 7-10 cSt; MW = 1,000-1,100 g/mol |
| Catalyst (A3-1) | Karstedt's catalyst, in xylenes |
| Crosslinking Compound (B-1) | Hydride terminated polydimethyl siloxane; viscosity (25° C.) = 100 cSt; MW = 4,000-5,000 g/mol |
| Crosslinking Compound (B-2) | Hydride terminated polydimethyl siloxane; viscosity (25° C.) = 500 cSt; MW = 17,200 g/mol |
| Crosslinking Compound (B-3) | Hydride terminated polydimethyl siloxane; viscosity (25° C.) = 7-10 cSt; MW = 1,000-1,100 g/mol |
| Catalyst (C-1) | Karstedt's catalyst, in xylenes |
| Polyorganosiloxane (Y-1) | Mono-hydride terminated polydimethyl siloxane; viscosity (25° C.) = 80-120 cSt; MW = 4,500-5,000 g/mol |
| Organic Polymer (Z-1) | Polybutadiene with 13.8% vinyl functionality; MW = 5,000 g/mol, |
| Organic Polymer (Z-2) | Polybutadiene with 71% vinyl functionality; MW = 1,400 g/mol, |
| Carrier Vehicle (S-1) | Dichloromethane |

General Procedure 1: Preparation of a Looped Organosilicon Compound

An Initial Organosilicon Compound (A1) (0.036 mmol) is combined with a Looping Compound (A2) (0.31 mmol) and a first Carrier Vehicle (12.5 mL) in a bottle under atmospheric conditions to prepare a solution. A Catalyst (A3) (0.00052 mmol) is then added to the solution and the bottle is sealed for 48 hours to prepare a Looped Organosilicon Compound. The solution containing the Looped Organosilicon Compound is then left open to atmosphere overnight.

General Procedure 2: Preparation of a Networked Silicone

A Crosslinking Compound (B) (0.21 mmol) is added to a solution of a Looped Organosilicon Compound and a second Carrier Vehicle. The second Carrier Vehicle is then removed from the solution under a vacuum at 20° C., and a Catalyst (C) (0.00052 mmol, 11.5 µm) is added to give a reaction mixture. The reaction mixture is mixed (VWR analog vortex mixer, speed 10, 10 s), transferred to container lined with a release film, and transferred to a vacuum oven. The mixture is then cured at room temperature (66 mbar; 24 hours), and post-cured at 120° C. (30 min) to prepare a Networked Silicone.

Examples 1-29: Preparation of Networked Silicones

Various networked silicones are prepared. In particular, Looped Organosilicon Compounds 1-29 are prepared using various Looping Compounds according to General Procedure 1 above, where: the Initial Organosilicon Compound is Initial Organosilicon Compound (A1-1); the first Carrier Vehicle is Carrier Vehicle (S-1); the Catalyst (A3) is Catalyst (A3-1); and each of Looped Organosilicon Compounds 1-29 has a final hydride/vinyl group ratio of 0.5.

The Looped Organosilicon Compounds 1-29 are then crosslinked using various Crosslinking Compounds according to General Procedure 2 above to prepare the networked silicones of Examples 1-29. In the crosslinking reaction, the second Carrier Vehicle is Carrier Vehicle (S-1); and Catalyst (C) is Catalyst (C-1).

The particular components and parameters utilized to prepare the networked silicones of Examples 1-29 are set forth in Table 2 below.

TABLE 2

Components and Parameters of Preparation Examples 1-29

| Example | Looping Compound (A2) | Crosslinking Compound (B) | % total molar quantity (A2)/ = [(A2) + (B)] |
|---|---|---|---|
| 1 | A2-1 | B-1 | 0 |
| 2 | A2-1 | B-1 | 20 |
| 3 | A2-1 | B-1 | 40 |
| 4 | A2-1 | B-1 | 50 |
| 5 | A2-1 | B-1 | 60 |
| 6 | A2-1 | B-1 | 80 |
| 7 | A2-1 | B-1 | 100 |
| 8 | A2-1 | B-2 | 0 |
| 9 | A2-1 | B-2 | 20 |
| 10 | A2-1 | B-2 | 40 |
| 11 | A2-1 | B-2 | 50 |
| 12 | A2-1 | B-2 | 60 |
| 13 | A2-1 | B-2 | 70 |
| 14 | A2-1 | B-2 | 80 |
| 15 | A2-1 | B-2 | 90 |
| 16 | A2-1 | B-2 | 100 |
| 17 | A2-2 | B-1 | 0 |
| 18 | A2-2 | B-1 | 20 |
| 19 | A2-2 | B-1 | 40 |
| 20 | A2-2 | B-1 | 50 |
| 21 | A2-2 | B-1 | 60 |
| 22 | A2-2 | B-1 | 70 |
| 23 | A2-2 | B-1 | 80 |
| 24 | A2-2 | B-1 | 90 |
| 25 | A2-2 | B-1 | 100 |
| 26 | A2-2 | B-2 | 0 |
| 27 | A2-2 | B-2 | 20 |
| 28 | A2-2 | B-2 | 40 |
| 29 | A2-2 | B-2 | 50 |

As shown in the last column of Table 2 above, the relative amounts of a given Looping Compound (A2) and a given Crosslinking Compound (B) are varied in each of Examples 1-29. More specifically, the molar quantity of a given Looping Compound (A2) as a percent of the total molar quantity of the Looping Compound and the Crosslinking Compound (B) utilized to prepare the networked silicone is given for each of the networked silicones of Examples 1-29.

Figure 12:
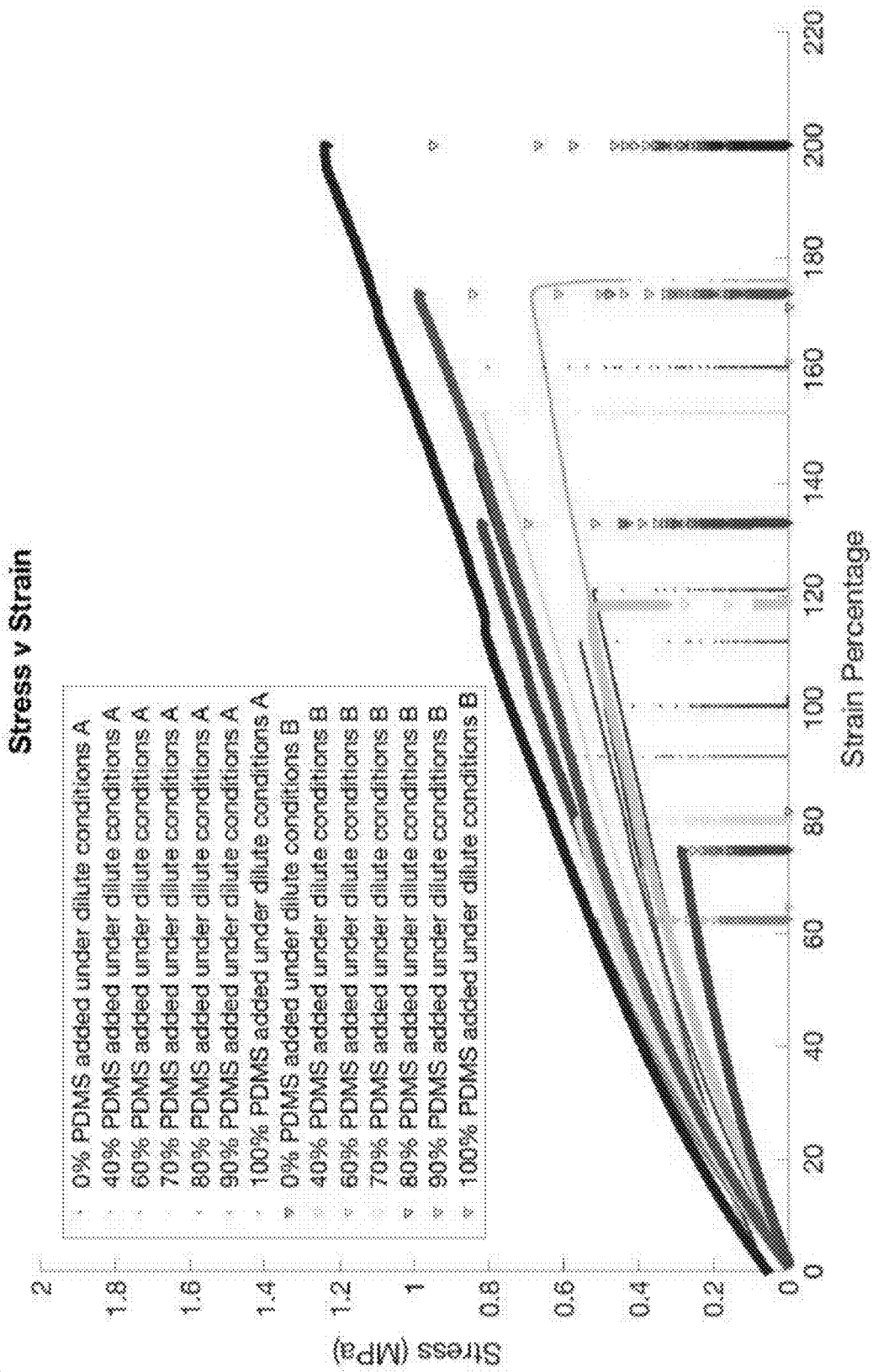
FIG. 12 is a plot of tensile data recorded for networked silicones of Examples 8, 10-16, 17, and 19-25.
Figure 13:
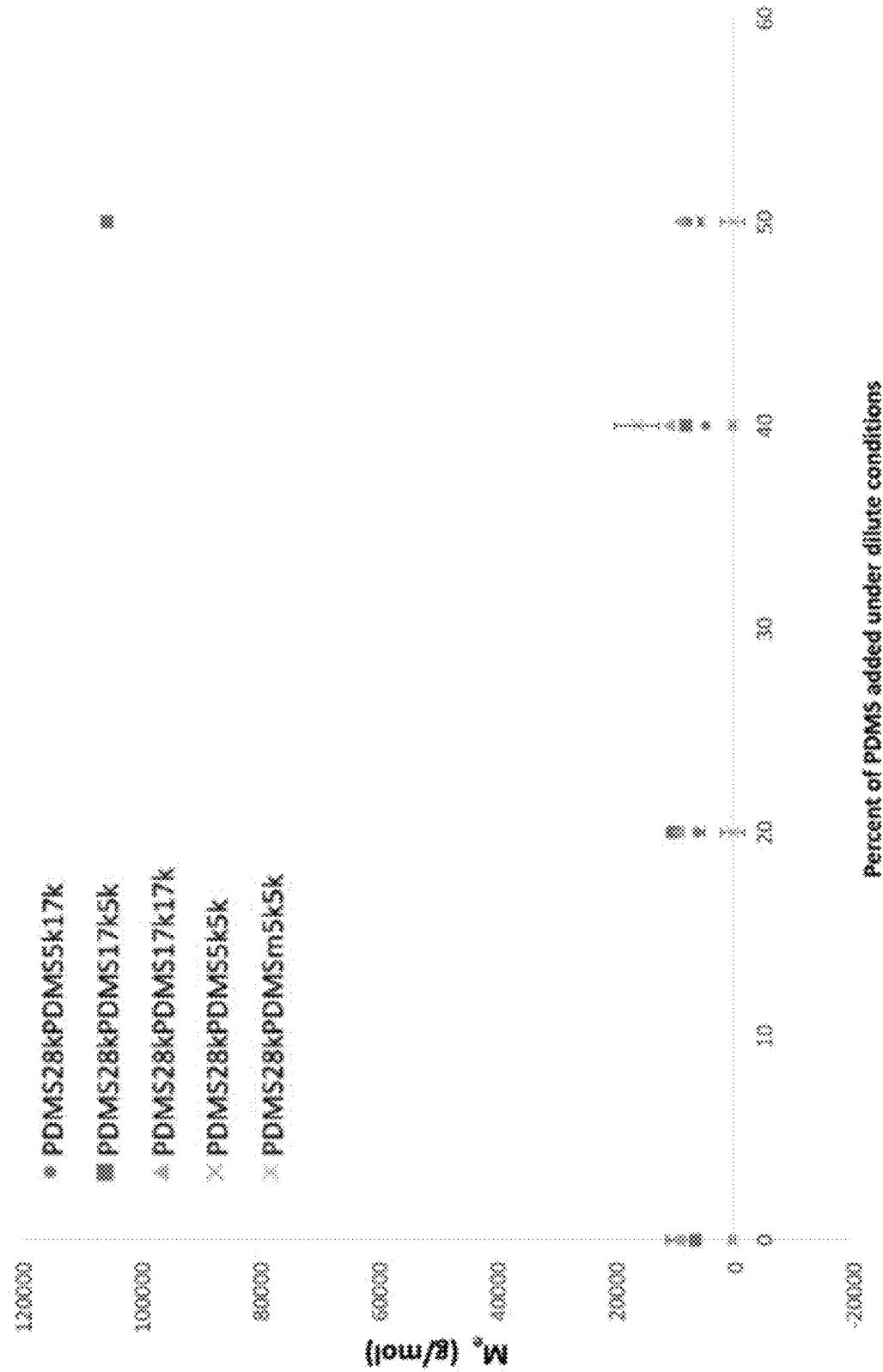
FIG. 13 is a plot of molecular weight data for various networked silicones prepared in accordance with some embodiments of the disclosure.
Figure 14:
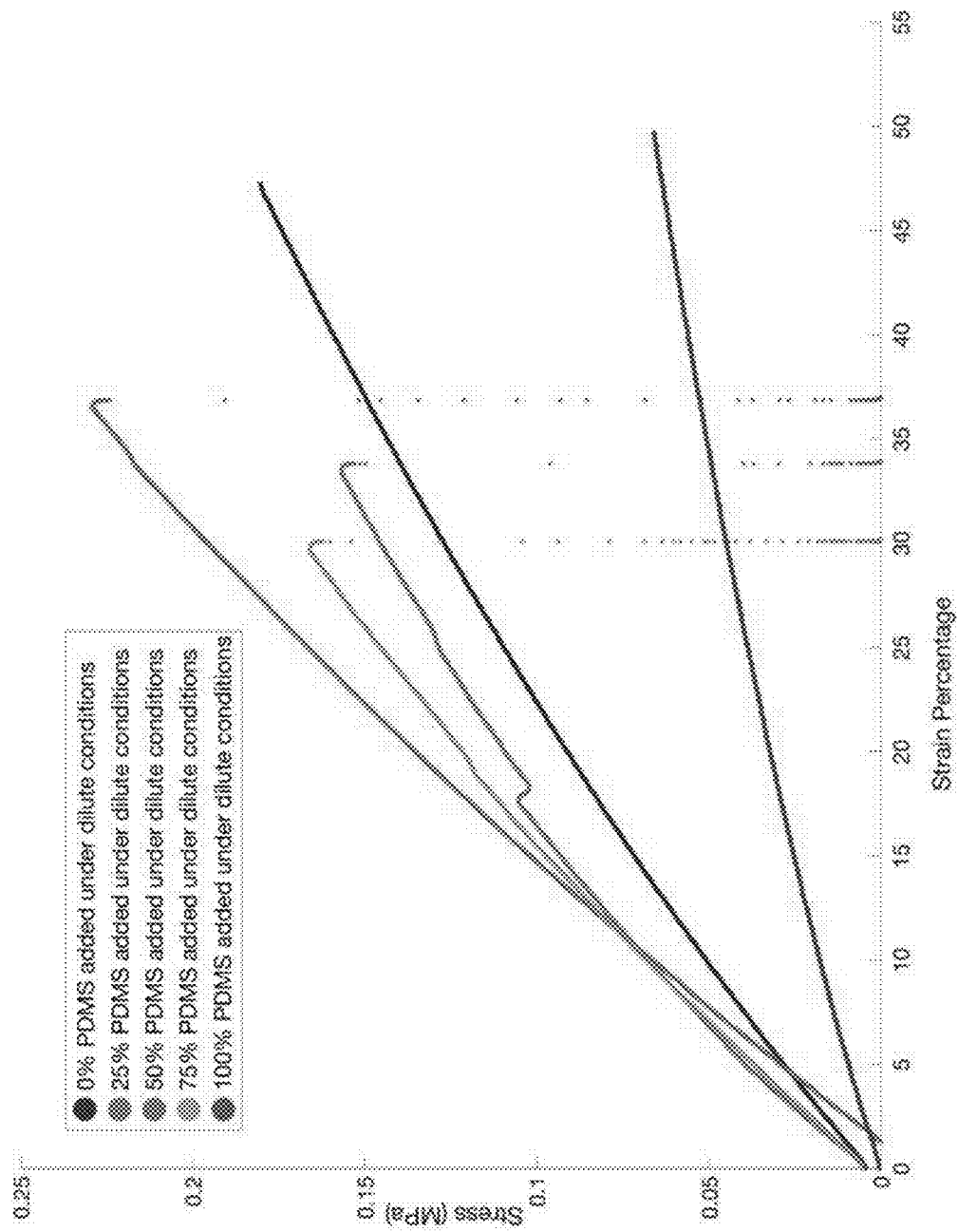
FIG. 14 is a plot of tensile data recorded for organic elastomers of Comparative Examples 6-10.
Figure 15:
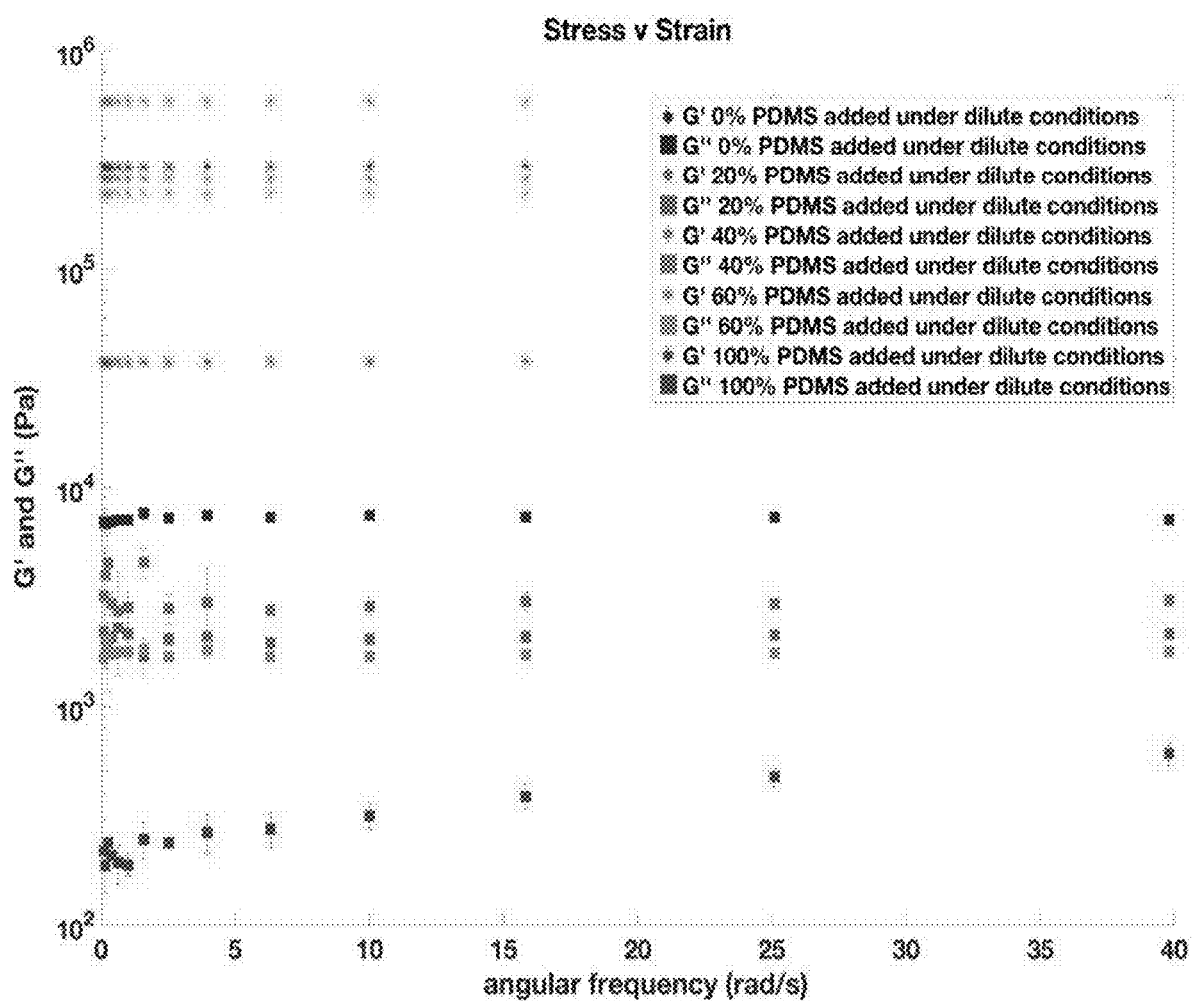
FIG. 15 is a plot of rheological data recorded for organic elastomers of Comparative Examples 11, 12, 14, 16, 18, and 19.

Once prepared, each of the networked silicones of Examples 1-29 is analyzed via the tensile testing, rheological measurements, GPC, and gel swelling described above. The results of the tensile testing is shown in FIGS. 2, 3, 9-11, and 14. The results of the rheological measurements is shown in FIGS. 12 and 13. The results of the GPC is shown in FIGS. 4-7. The results of the gel swelling are shown in FIG. 15.

Comparative Examples 1-4: Non-Looped Silicone Elastomers

Various silicone elastomers are prepared in Comparative Examples 1-4. In particular, four non-looped organosilicon compounds are prepared according to the procedure set forth in General Procedure 1, where: the Initial Organosilicon Compound is Initial Organosilicon Compound (A1-1); the first Carrier Vehicle is Carrier Vehicle (S-1); the Catalyst (A3) is Catalyst (A3-1); and a mono-hydride functional organosilicon compound (Polyorganosiloxane (Y-1)) is utilized instead of a Looping Compound. Each of the non-looped organosilicon compounds is concentrated, and then reacted with a 1:1 mixture of Crosslinking Compound (B-1) and Polyorganosiloxane (Y-1) to give four non-looped silicone elastomers having a final molar ratio of 1:1 (B-1):(Y1).

The relative amount of the Polyorganosiloxane (Y-1) utilized during the initial reaction is varied, with amounts of Polyorganosiloxane (Y-1) utilized as a percent of the total molar quantity of the Polyorganosiloxane (Y-1) and Crosslinking Compound (B-1) being 0%, 20%, 40%, and 50%, for Comparative Examples 1-4, respectively.

Once prepared, the silicone elastomers of Comparative Examples 1-4 are analyzed via the tensile testing as described above, the results of which is shown in FIGS. 1 and 8.

General Procedure 3: Preparation of Organic Elastomers

An Organic Polymer (Z) (0.06 mmol) is combined with a Looping Compound (A2) (0.18 mmol) and a Carrier Vehicle (S) (12.5 mL) in a scintillation vial under atmospheric conditions. A solution of Catalyst (A3) (0.002 mmol) is added, the scintillation vial sealed for 18 hours, and the resulting mixture then left open to atmosphere overnight. The mixture is then concentrated (vacuum, 20° C.). A Crosslinking Compound (B) (0.12 mmol) is then added to the concentrated mixture, which is then mixed for 20 seconds and charged with a Catalyst (C) (0.002 mmol) to give a second mixture. The second mixture is mixed (Vortex Mixer, VWR analog vortex mixer, speed 10, 10 s), poured into a Teflon mold, and cured in a vacuum oven connected at room temperature (66 mbar, 24 hours) to give an organic elastomer. The organic elastomer is then demolded with a metal spatula.

Comparative Example 5-18: Organic Elastomers

Various organic elastomers are prepared in each of Comparative Examples 5-18 according to the procedure set forth in General Procedure 3 above, where: Catalyst (A3) is Catalyst (A3-1); and Carrier Vehicle is Carrier Vehicle (S-1).

The particular components and parameters utilized to prepare the organic elastomers of Comparative Examples 5-18 are set forth in Table 3 below.

TABLE 3

Components and Parameters of Comparative Examples 5-18

| Comparative Example | Organic Polymer (Z) | Looping Compound (A2) | Crosslinking Compound (B) | % total molar quantity (A2)/ = [(A2) + (B)] | Hydride/ Vinyl Group Ratio |
|---|---|---|---|---|---|
| 5 | Z-1 | B-1 | B-1 | 0 | 0.5 |
| 6 | Z-1 | B-1 | B-1 | 25 | 0.5 |
| 7 | Z-1 | B-1 | B-1 | 50 | 0.5 |
| 8 | Z-1 | B-1 | B-1 | 75 | 0.5 |
| 9 | Z-1 | B-1 | B-1 | 100 | 0.5 |
| 10 | Z-2 | B-3 | B-3 | 0 | 1 |
| 11 | Z-2 | B-3 | B-3 | 20 | 1 |
| 12 | Z-2 | B-3 | B-3 | 25 | 1 |
| 13 | Z-2 | B-3 | B-3 | 40 | 1 |
| 14 | Z-2 | B-3 | B-3 | 50 | 1 |
| 15 | Z-2 | B-3 | B-3 | 60 | 1 |
| 16 | Z-2 | B-3 | B-3 | 75 | 1 |
| 17 | Z-2 | B-3 | B-3 | 80 | 1 |
| 18 | Z-2 | B-3 | B-3 | 100 | 1 |

Figure 16:
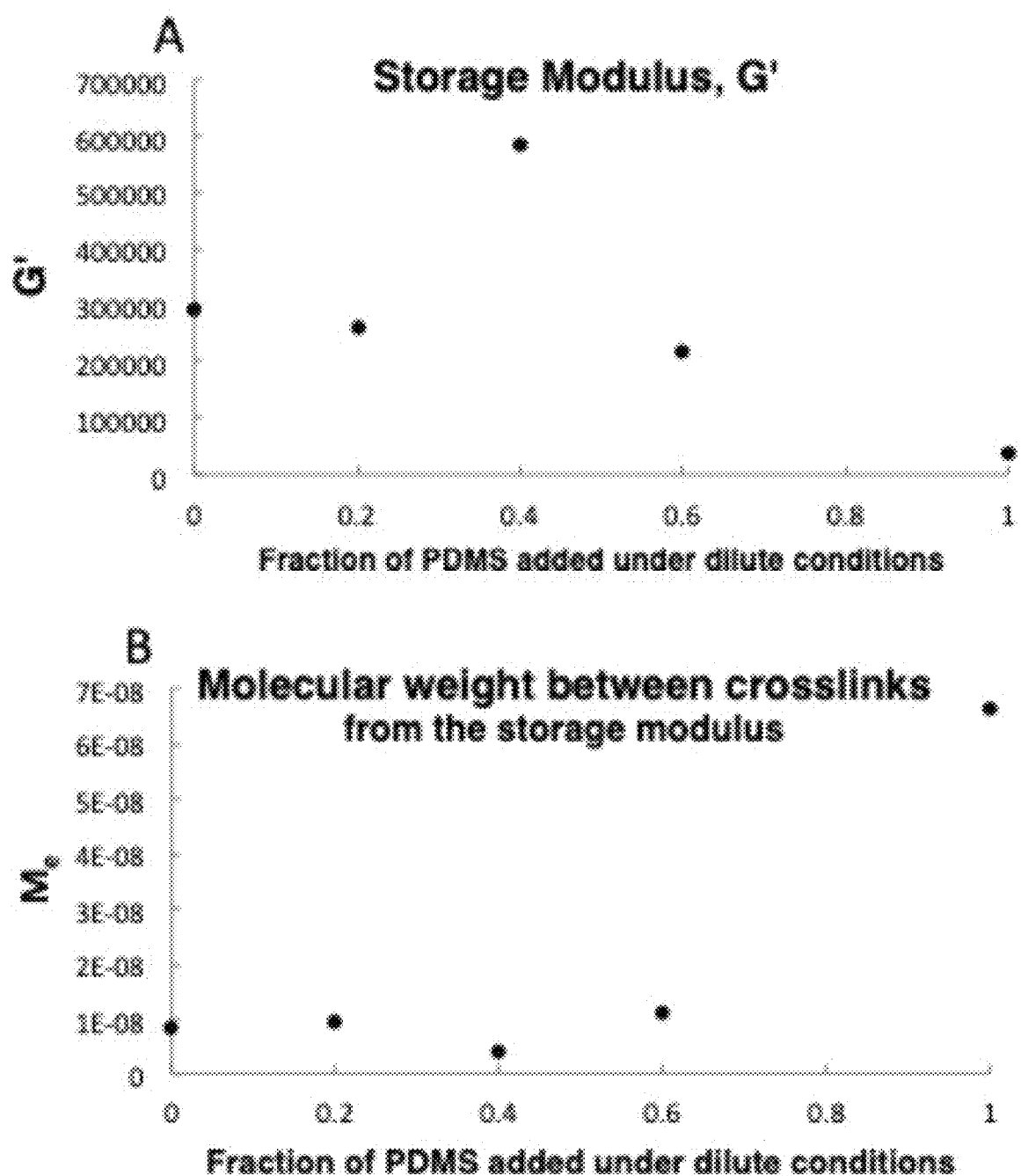
FIGS. 16 A, B, C, and D are a series of plots of gel swelling data for organic elastomers of Comparative Examples 11, 12, 14, 16, 18, and 19.
Figure 16:
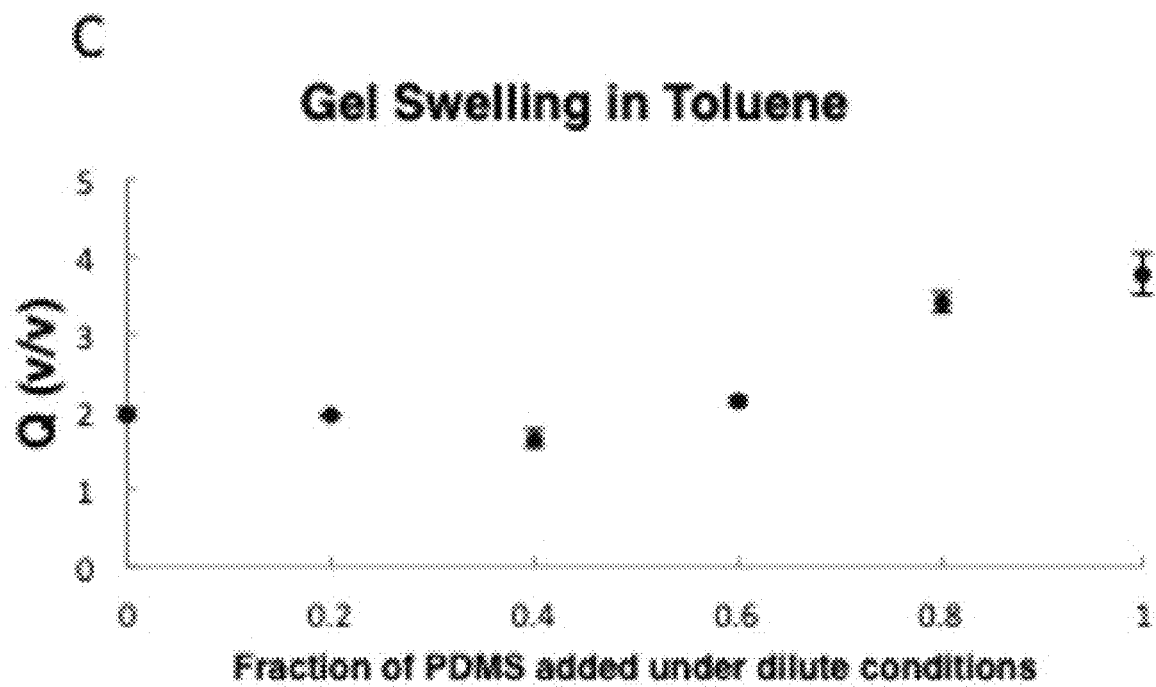
Figure 16:
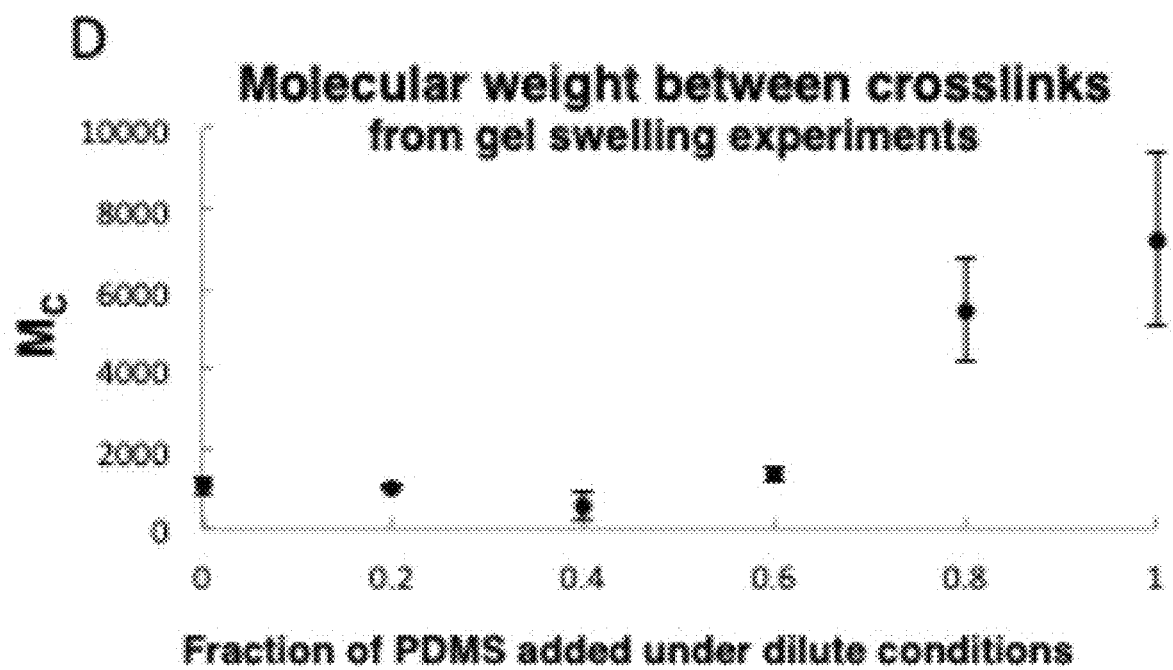
Figure 17:
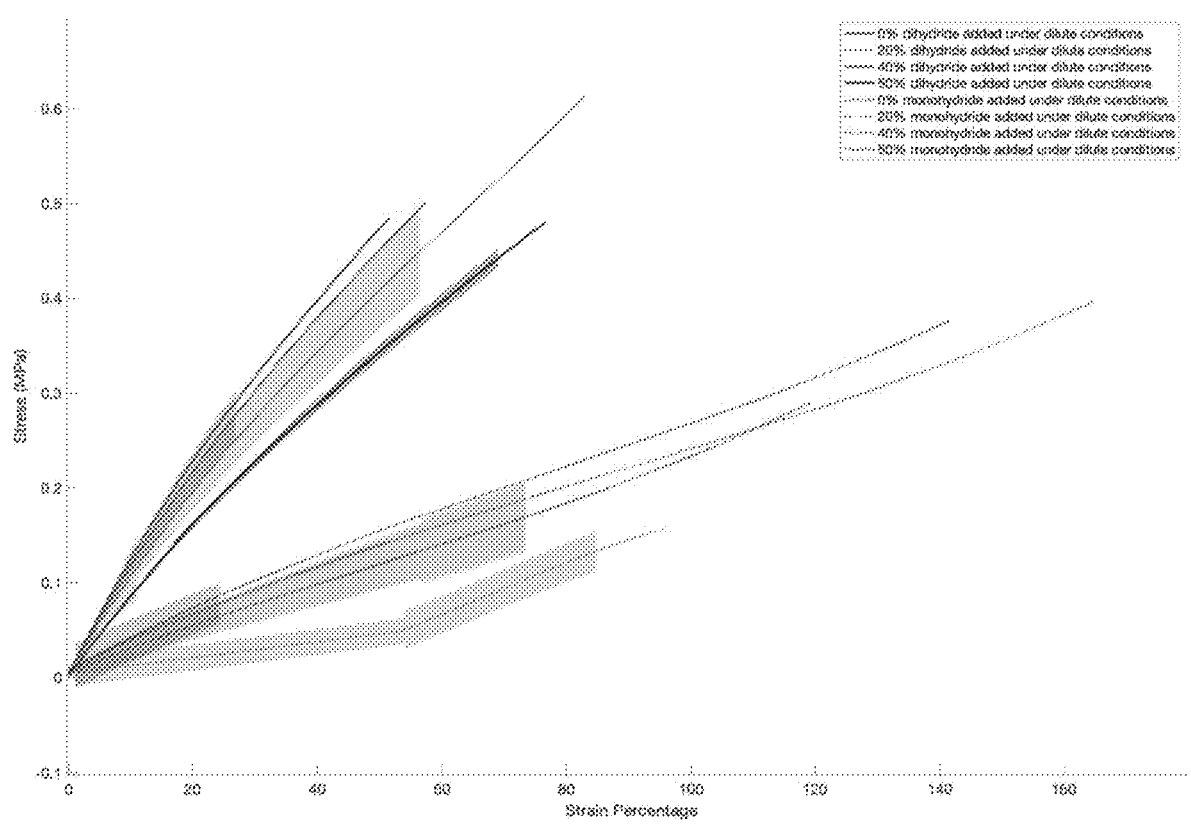
FIG. 17 is a plot of tensile data recorded for networked silicones of Examples 1-4 and non-looped silicone elastomers of Comparative Examples 1-4.
Figure 18:
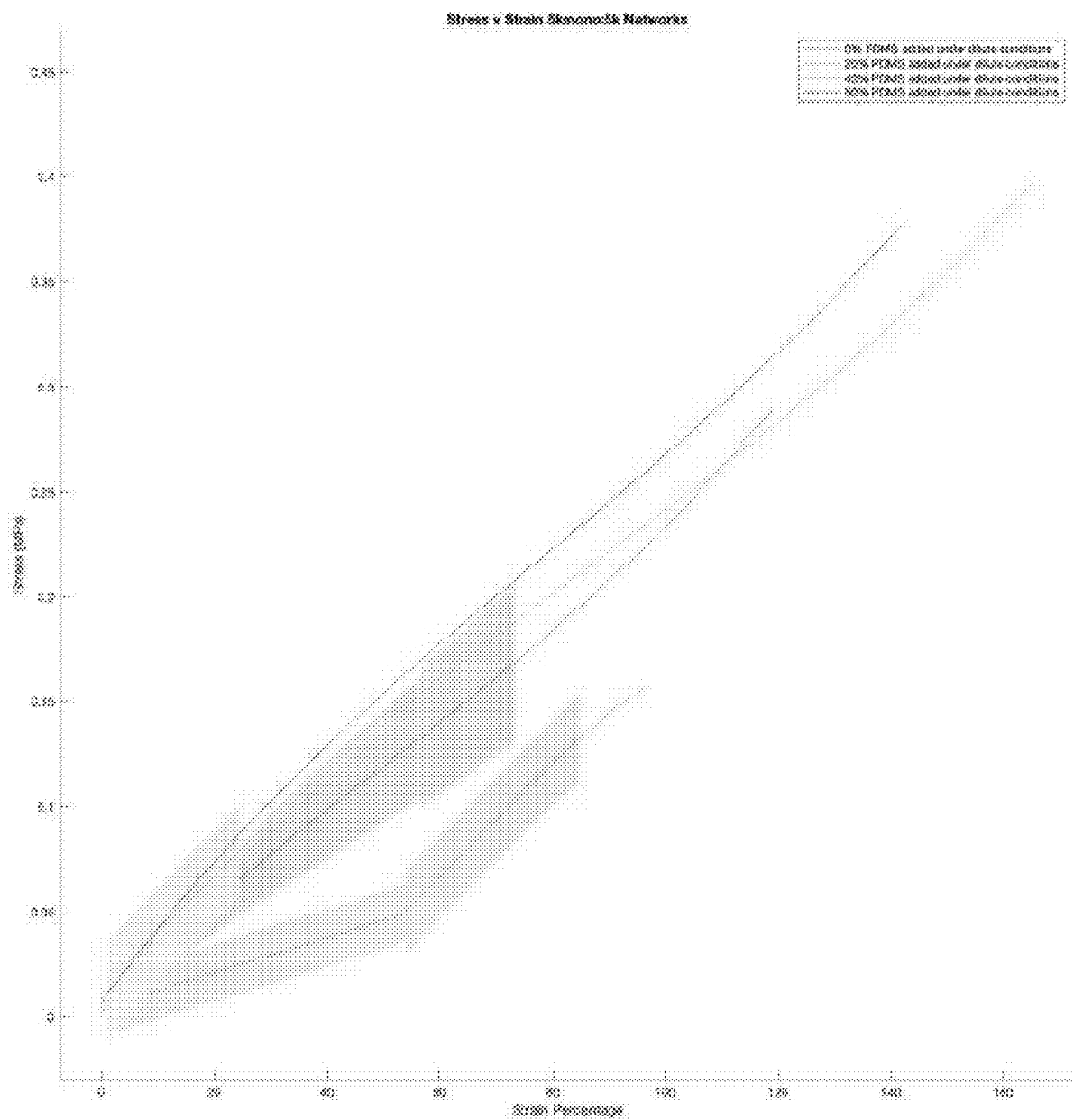
FIG. 18 is a plot of tensile data recorded for non-looped silicone elastomers of Comparative Examples 1-4.

Once prepared, each of the organic elastomers of Comparative Examples 5-18 is analyzed via the tensile testing, rheological measurements, and gel swelling tests as described above. The results of the tensile testing are shown in FIG. 16. The results of the rheological measurements are shown in FIG. 17. The results of the gel swelling are shown in FIG. 18.

Figure 2:
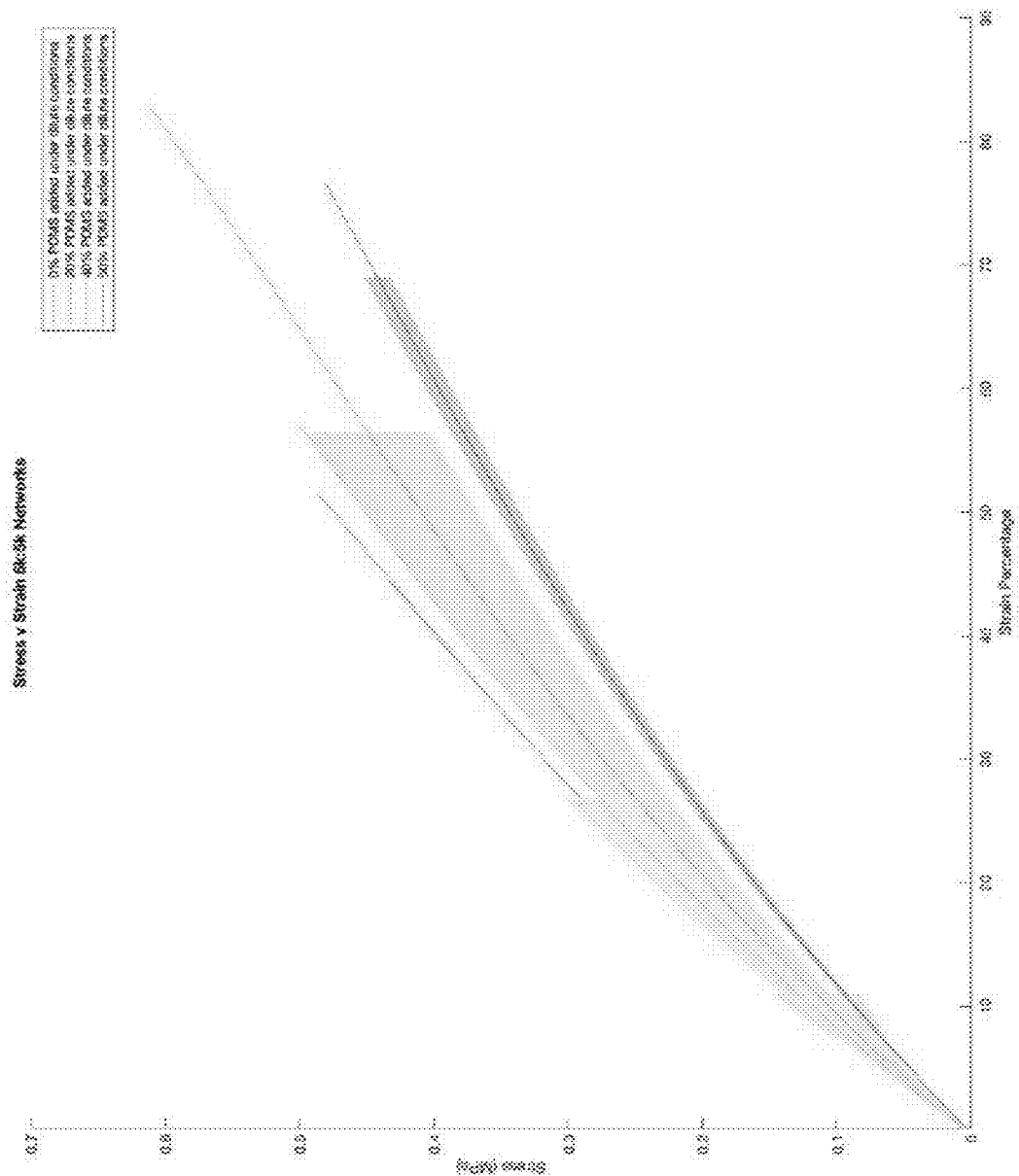
FIG. 2 is a plot of tensile data recorded for networked silicones of Examples 1-4.
Figure 3:
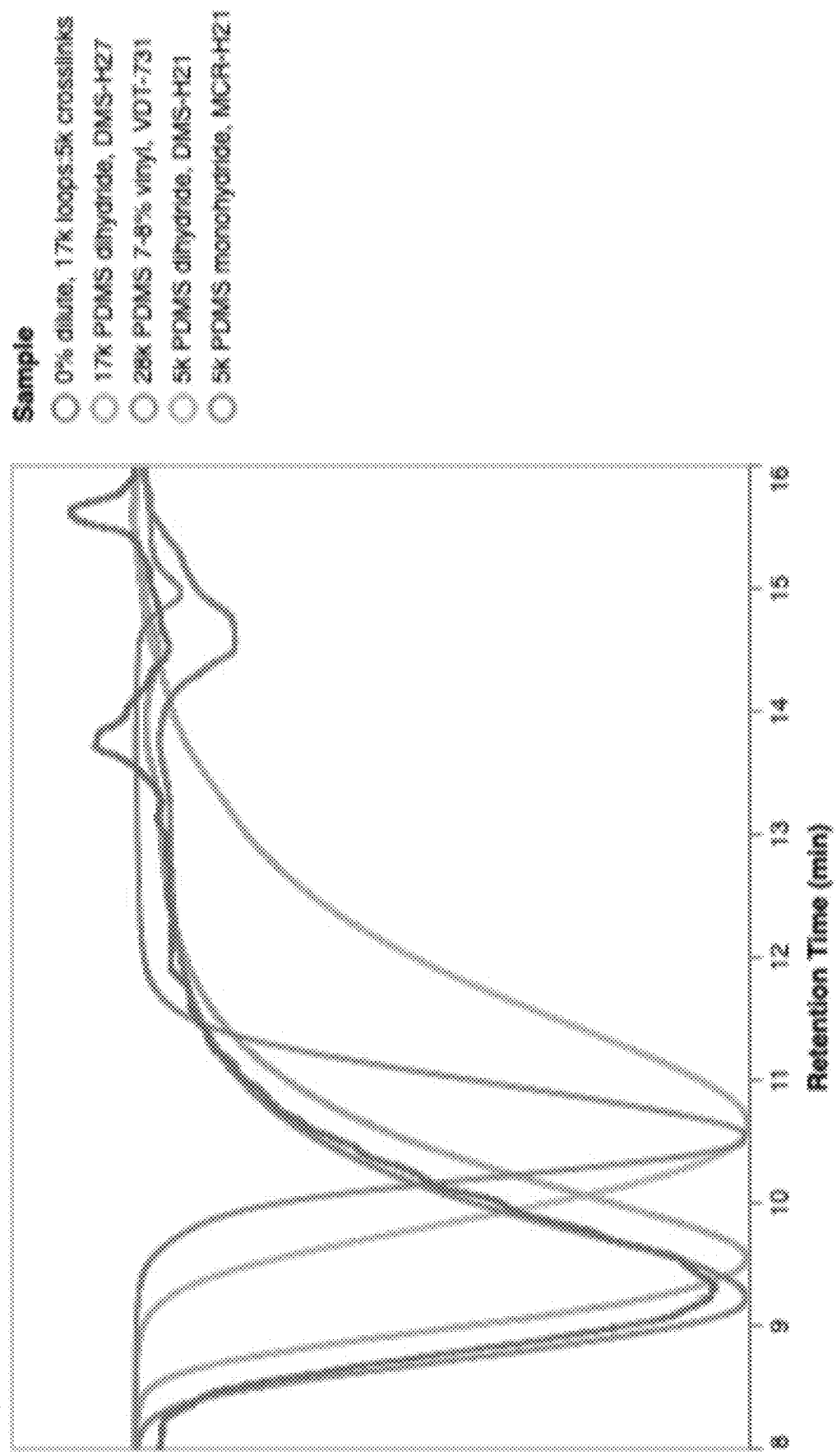
FIG. 3 is a plot of Gel permeation chromatography (GPC) data recorded for various components utilized in the Examples, including networked silicones of Example 17.
Figure 4:
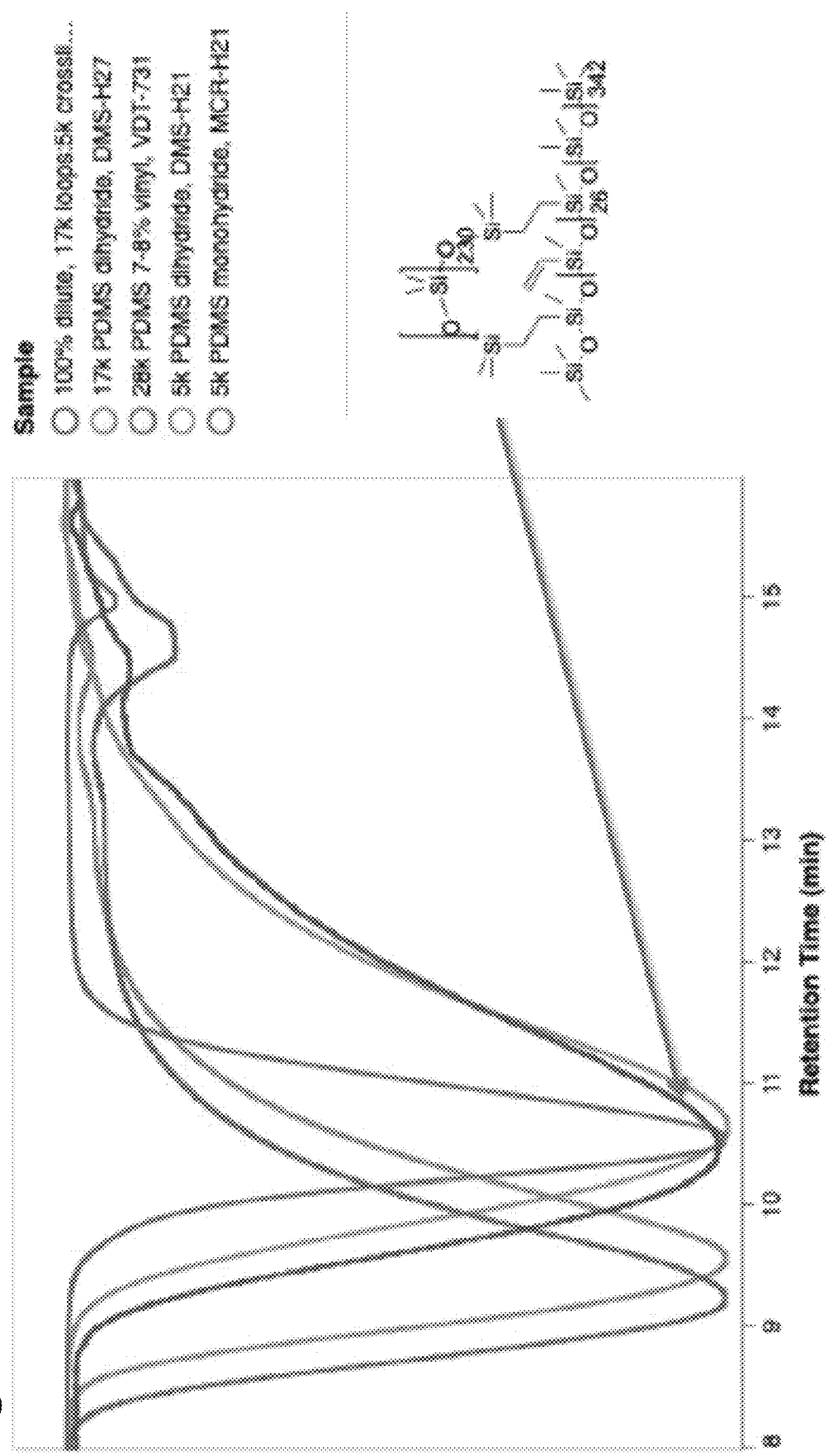
FIG. 4 is a plot of GPC data recorded for various components utilized in the Examples, including networked silicones of Example 25.
Figure 5:
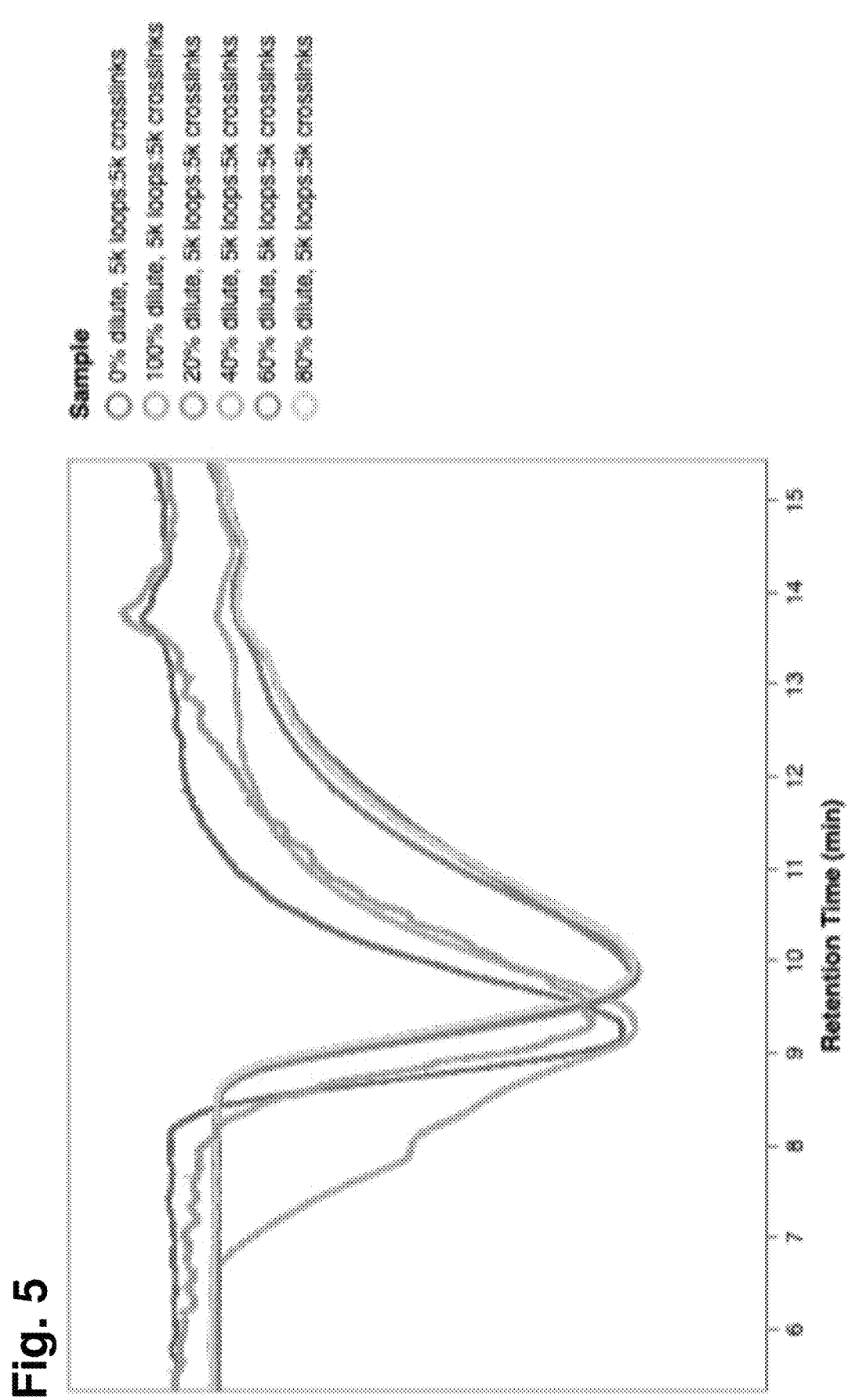
FIG. 5 is a plot of GPC data recorded for networked silicones of Example 1-7.
Figure 6:
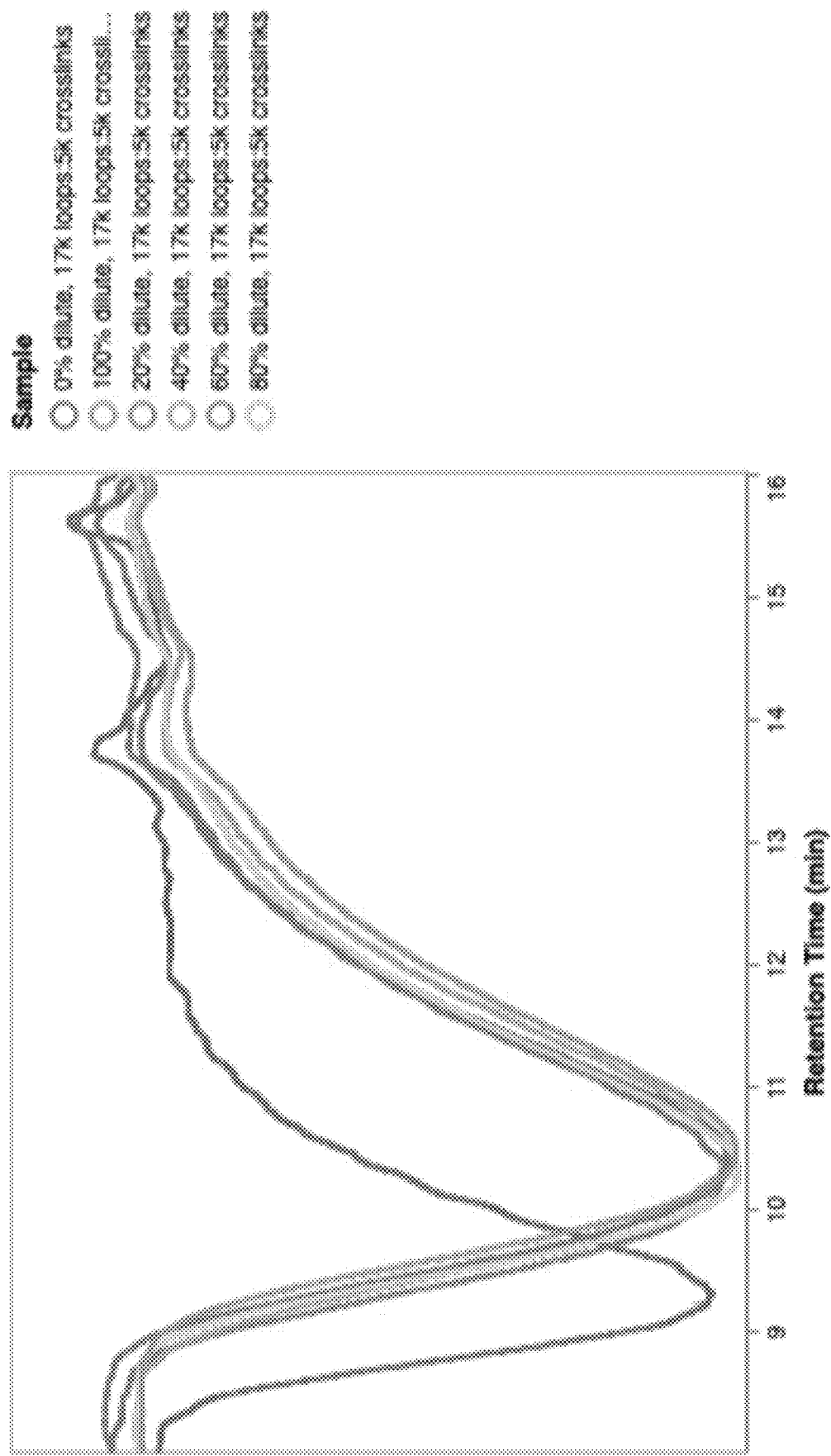
FIG. 6 is a plot of GPC data recorded for networked silicones of Example 17-21 and Example 23-25.
Figure 7:
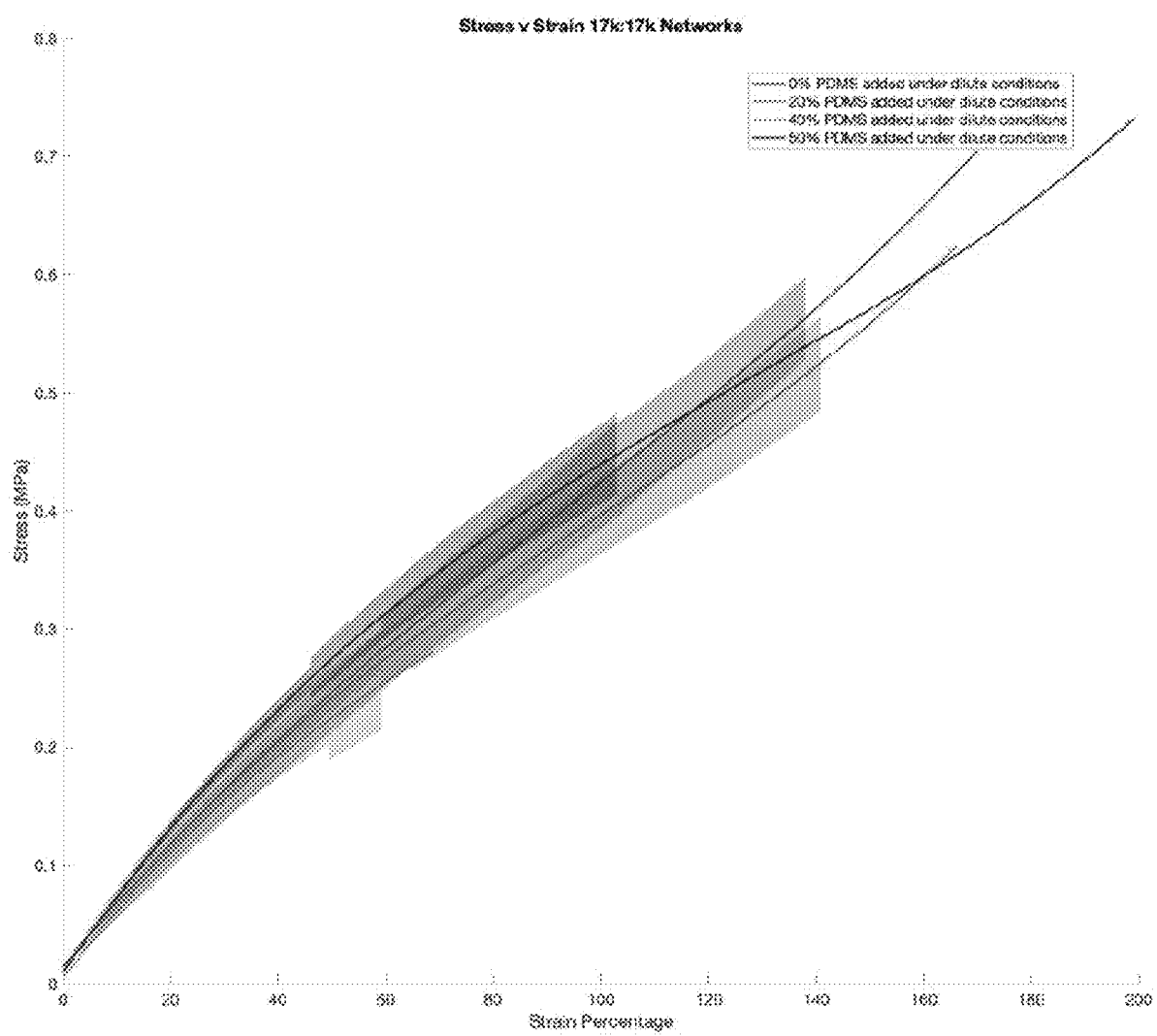
FIG. 7 is a plot of tensile data recorded for networked silicones of Examples 26-29.
Figure 8:
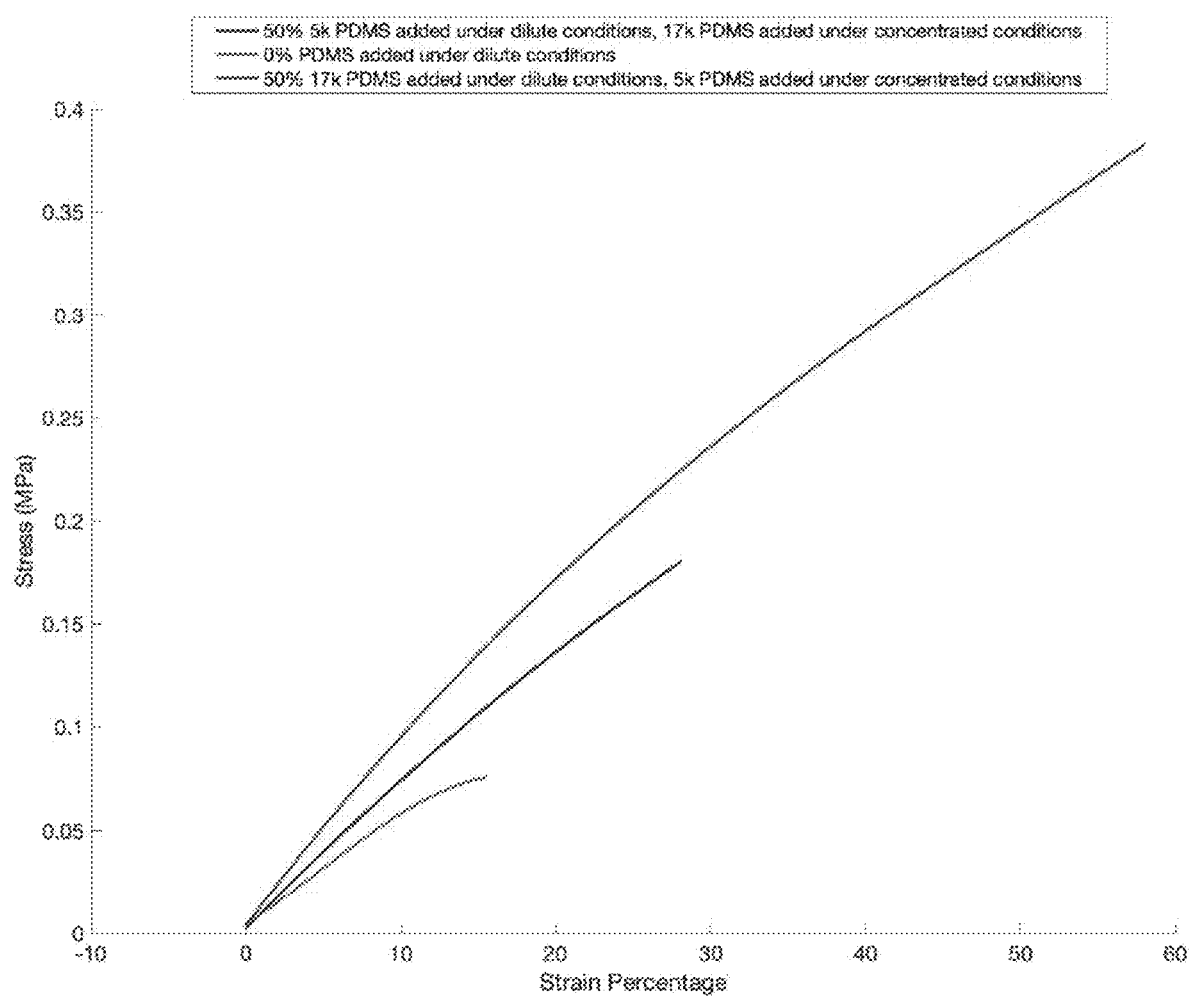
FIG. 8 is a plot of tensile data recorded for networked silicones of Examples 11 and 21.
Figure 9:
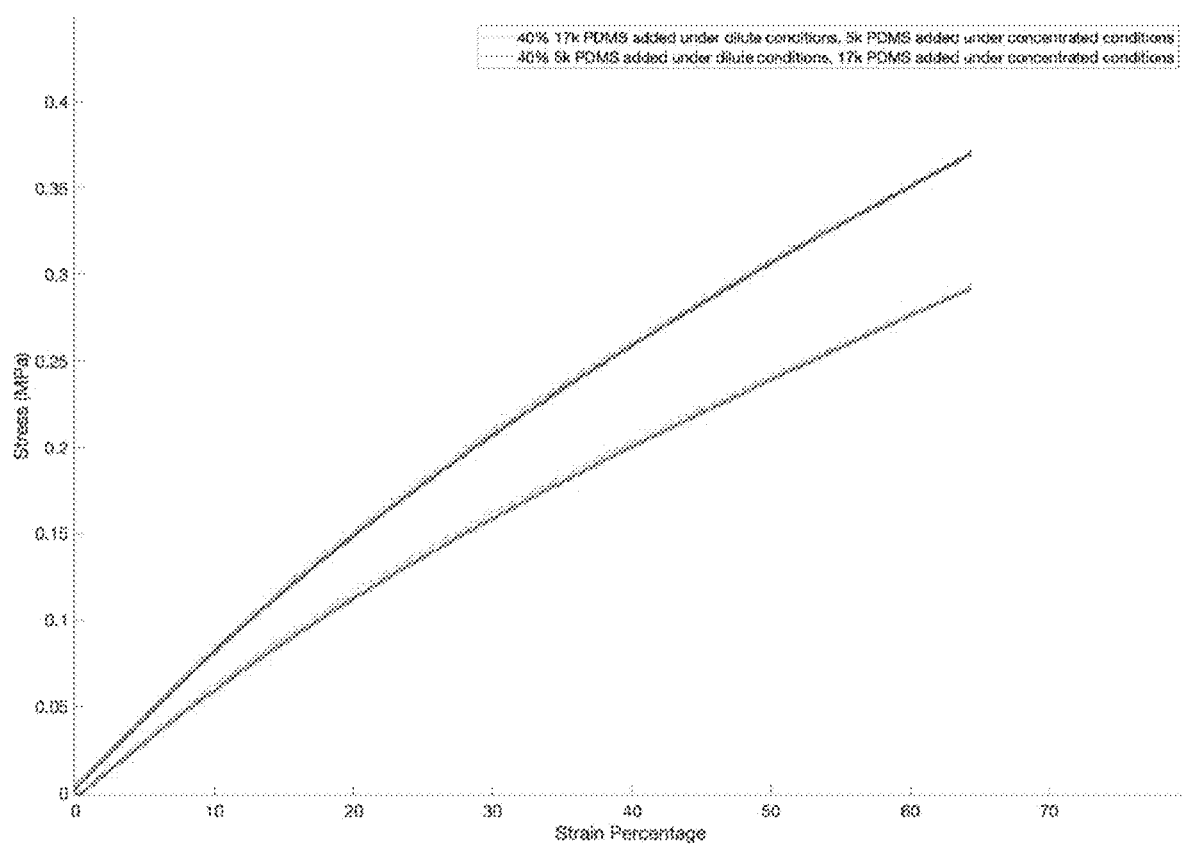
FIG. 9 is a plot of tensile data recorded for networked silicones of Examples 10 and 19.
Figure 10:
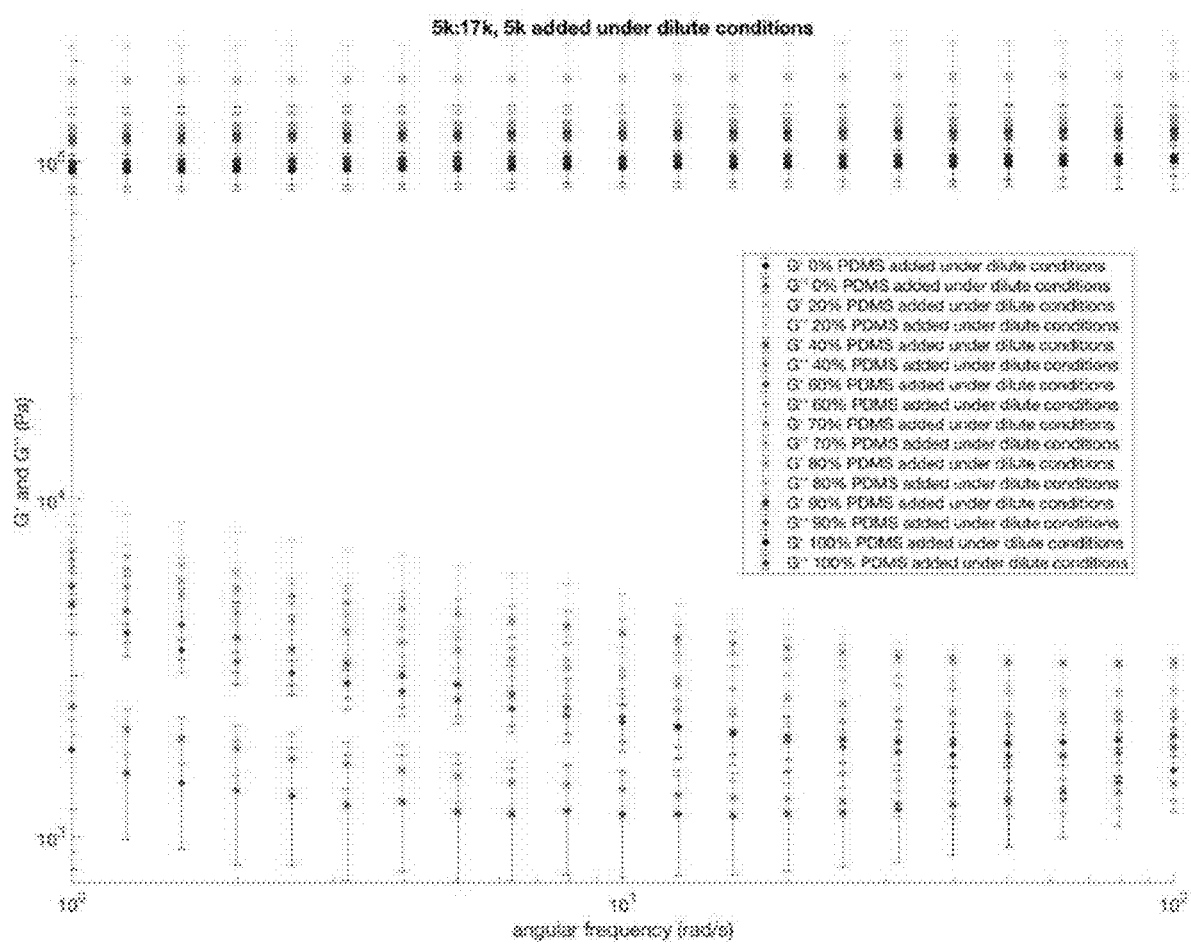
FIG. 10 is a plot of rheological data recorded for networked silicones of Examples 8-10 and Examples 12-16.
Figure 11:
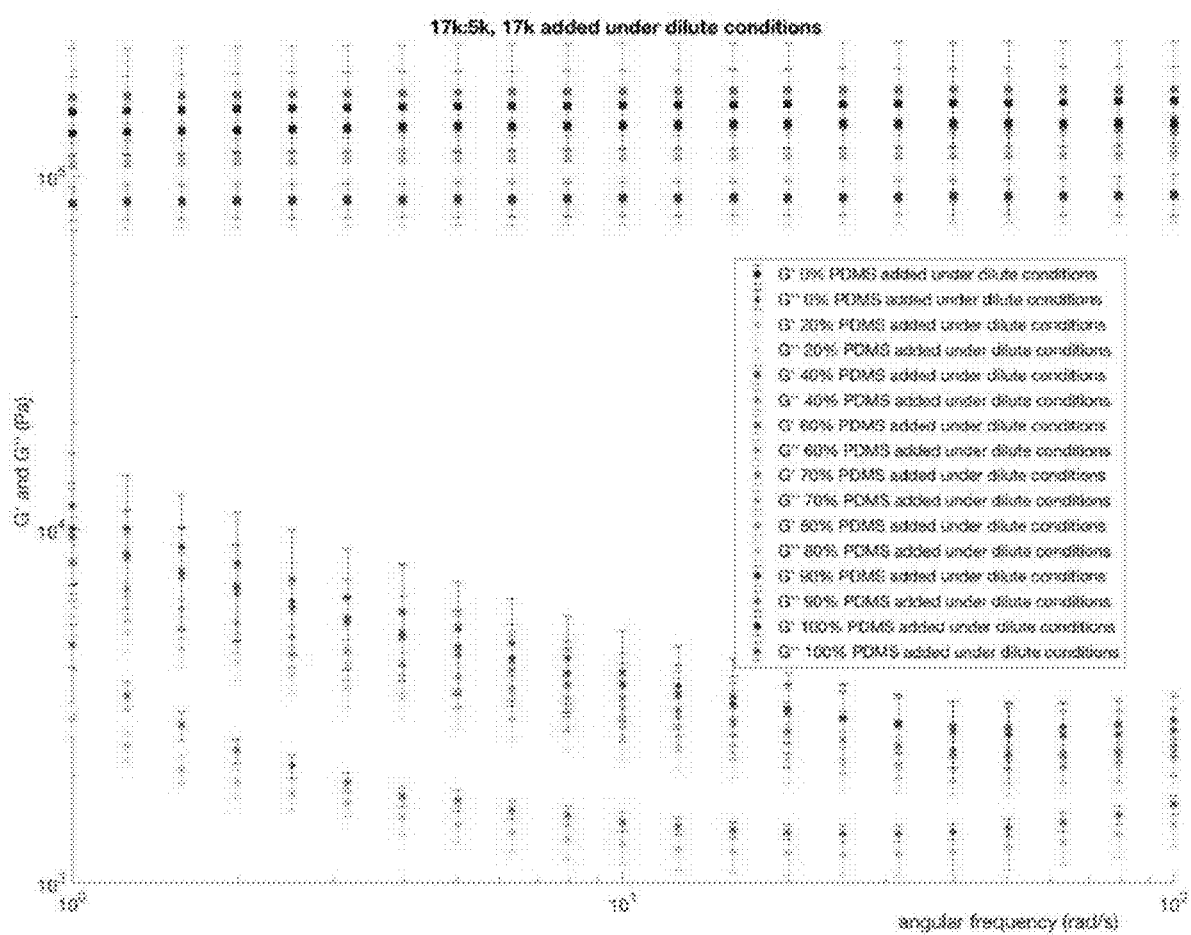
FIG. 11 is a plot of rheological data recorded for networked silicones of Examples 17-19 and Examples 21-25.

The networked silicones of the present embodiments exhibit superior tensile characteristics as compared to various non-looped silicone elastomers and organic elastomers, as illustrated by the comparative results shown in FIGS. 2 and 8.

The invention claimed is:

1. A composition for preparing a networked silicone, comprising:

(A) a looped organosilicon compound having the general formula (I):

$$[R^1{}_3SiO_{1/2}]_a[R^2{}_2SiO_{2/2}]_b[R^1SiO_{3/2}]_c[X]_d[Z]_e \quad (I),$$

where each X is a looped moiety having the general formula (II):

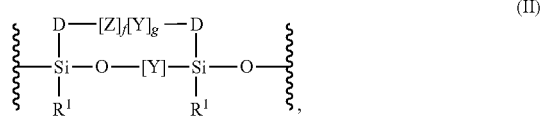

(II)

wherein each Y is an independently selected siloxane moiety having the formula $[R^2{}_iSiO_{(4-i)/2}]_h$; each Z is an independently selected organic moiety; each $R^1$ is an independently selected hydrocarbyl group; each $R^2$ is independently $R^1$ or a cross-linkable group, with the proviso that at least one $R^2$ is the cross-linkable group; each D is an independently selected divalent linking group; subscripts a, b, c, d, and e are each mole fractions such that a+b+c+d+e=1, with the provisos that $0 \leq a<1$, $0<b<1$, $0 \leq c<1$, $0<d<1$, and $0 \leq e<1$; subscripts f and g are each independently 0 or 1 with the proviso that f+g>0 in each looped moiety X; each subscript h is independently from 1 to 1000; subscript i is independently selected from 1, 2, and 3 in each moiety indicated by subscript h; and moieties indicated by subscripts a, b, c, d, and e may be in randomized or block form in the looped organosilicon compound (A); and (B) a crosslinking compound having the general formula $R^3$-L-$R^3$, where L is a linking group and each $R^3$ is an independently selected functional group reactive with the cross-linkable group $R^2$ of the looped organosilicon compound (A); and, optionally, (C) a catalyst.

2. The composition of claim 1, wherein the cross-linkable group $R^2$ comprises a functional group that is: (i) hydrosilylatable; (ii) condensable; (iii) displaceable; (iv) nucleophilic; (v) electrophilic; or (vi) a combination of (i)-(v).

3. The composition of claim 1, wherein: (i) each $R^1$ is methyl; (ii) each D is selected from —(CH$_2$)$_2$—, —(CH$_2$)$_3$—, —CH(CH$_3$)CH$_2$—, and —CH$_2$CH(CH$_3$)CH$_2$—; (iii) subscript e is 0; (iv) each subscript f is 0; (v) each subscript g is 1; (vi) each subscript h is independently from 50 to 1000; (vii) each cross-linkable group $R^2$ of the looped organosilicon compound (A) is an alkenyl group or H; or (viii) any combination of (i)-(vii).

4. The composition of claim 1, wherein linking group L comprises: (i) a siloxane segment; (ii) an organic segment; or (iii) both (i) and (ii).

5. The composition of claim 1, wherein each functional group $R^3$ is: (i) hydrosilylatable; (ii) condensable; (iii) displaceable; (iv) nucleophilic; (v) electrophilic; or (vi) a combination of (i)-(v).

6. The composition of claim 1, wherein: (i) linking group L is a siloxane segment having the formula $[R^1{}_2SiO_{2/2}]_j$, where each $R^1$ is an independently selected hydrocarbyl group and subscript j is from 20 to 500; (ii) each $R^3$ is an alkenyl group or H; or (iii) both (i) and (ii).

7. The composition of claim 1, further comprising: (i) a carrier; (ii) a filler; (iii) a filler treating agent; (iv) a surface modifier; (v) a surfactant; (vi) a rheology modifier; (vii) a viscosity modifier; (viii) a binder; (ix) a thickener; (x) a tackifying agent; (xi) an adhesion promotor; (xii) a defoamer; (xiii) a compatibilizer; (xiv) an extender; (xv) a plasticizer; (xvi) an end-blocker; (xvii) a reaction inhibitor; (xviii) a drying agent; (xix) a water release agent; (xx) a colorant; (xxi) an anti-aging additive; (xxii) a biocide; (xxiii) a flame retardant; (xxiv) a corrosion inhibitor; (xxv) a catalyst inhibitor; (xxvi) a UV absorber; (xxvii) an anti-oxidant; (xxviii) a light-stabilizer; (xxix) a catalyst, procatalyst, or catalyst generator; (xxx) an initiator; (xxxi) a photoacid generator; or (xxxii) a combination of (i)-(xxxi).

8. A cured product of the composition of claim 1.

9. A method of forming a composite article comprising a networked silicone, said method comprising:
   disposing a composition on a substrate; and
   curing the composition to give the networked silicone on the substrate, thereby forming the composite article;
   wherein the composition is the composition of claim 1.

10. A composite article formed according to the method of claim 9.

\* \* \* \* \*